(12) United States Patent
Mizuno et al.

(10) Patent No.: US 10,059,252 B2
(45) Date of Patent: Aug. 28, 2018

(54) VEHICLE HEADLIGHT CONTROL DEVICE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Ryu Mizuno, Kariya (JP); Shinichi Futamura, Kariya (JP); Tatsuya Takagaki, Nisshin (JP); Takatoshi Nakagawa, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/738,518

(22) PCT Filed: Jun. 9, 2016

(86) PCT No.: PCT/JP2016/067201
§ 371 (c)(1),
(2) Date: Dec. 20, 2017

(87) PCT Pub. No.: WO2016/208408
PCT Pub. Date: Dec. 29, 2016

(65) Prior Publication Data
US 2018/0170241 A1 Jun. 21, 2018

(30) Foreign Application Priority Data
Jun. 26, 2015 (JP) ................. 2015-128745

(51) Int. Cl.
*B60Q 1/02* (2006.01)
*B60Q 1/04* (2006.01)
(Continued)

(52) U.S. Cl.
CPC .............. *B60Q 1/04* (2013.01); *F21S 41/141* (2018.01); *H04N 5/2253* (2013.01)

(58) Field of Classification Search
CPC .... B60Q 3/0293; B60Q 11/005; B60Q 1/387; B60Q 1/2603; B60Q 3/048; B60Q 1/1423;
(Continued)

(56) References Cited

U.S. PATENT DOCUMENTS 7,985,010 B2 * 7/2011 Kamioka ............... B60Q 1/085
362/465
2013/0242100 A1 9/2013 Seki
(Continued)

FOREIGN PATENT DOCUMENTS

JP 2008-143505 6/2008
JP 2012-126200 A 7/2012
(Continued)

*Primary Examiner* — Minh D A
(74) *Attorney, Agent, or Firm* — Knobbe, Martens, Olson & Bear, LLP

(57) ABSTRACT

A lamp ECU acquires, from a sensor, a position of a target light source of a forward vehicle when viewed from a sensor mounting position, calculates, on a basis of an amount of position deviation between a lighting fixture mounting position and the sensor mounting position, a parallax-corrected direction of a target position, based on the acquired position of the target light source, when viewed from the lighting fixture mounting position, and outputs a light shielding range on a basis of the calculated parallax-corrected direction.

8 Claims, 21 Drawing Sheets

$\theta_{LL} = \operatorname{atan}\{(L \cdot \tan\theta_L + d1 - D1)/L\}$

(51) Int. Cl.
*H04N 5/225* (2006.01)
*F21S 41/141* (2018.01)

(58) Field of Classification Search
CPC .............. B60Q 2300/314; B60Q 1/143; B60Q 1/1415; B60Q 2300/42; B60R 16/03; H02K 21/48; B62J 6/001; B62J 6/003; H02J 7/1492
See application file for complete search history.

(56) References Cited

U.S. PATENT DOCUMENTS

| | | |
|---|---|---|
| 2015/0062937 A1 | 3/2015 | Kasai et al. |
| 2015/0145956 A1* | 5/2015 | Hayakawa ................ B60S 1/56 348/46 |
| 2016/0167566 A1 | 6/2016 | Tanaka et al. |

FOREIGN PATENT DOCUMENTS

| | | |
|---|---|---|
| JP | 2012-187950 A | 10/2012 |
| JP | 2013-079044 A | 5/2013 |
| JP | 2013-184602 A | 9/2013 |
| JP | 2015-016775 A | 1/2015 |

\* cited by examiner

| r | PRECEDING VEHICLE | ONCOMING VEHICLE |
|---|---|---|
| LARGE VEHICLE | r1_L | r2_L |
| STANDARD VEHICLE | r1_M | r2_M |
| TWO-WHEELED VEHICLE | r1_S | r2_S |
|  |  |  |

| d | PRECEDING VEHICLE | ONCOMING VEHICLE |
|---|---|---|
| LARGE VEHICLE | d1_L | d2_L |
| STANDARD VEHICLE | d1_M | d2_M |
| TWO-WHEELED VEHICLE | d1_S | d2_S |
|  |  |  |

$$\theta_{LL} = \text{atan}\{(L \cdot \tan\theta_L + d1 - D1)/L\}$$

$$-\theta_{LL} = \text{atan}\{(-L \cdot \tan\theta_L - d1 + D1)/(L + r1)\}$$

$$\theta_{LL} = \text{atan}\{(L \cdot \tan\theta_L + d2)/L\}$$

$$-\theta_{LL} = \operatorname{atan}\{(-L \cdot \tan\theta_L - d2 + D1)/(L + r2)\}$$

$$\theta_{LR} = \text{atan}\{(L \cdot \tan \theta_R - d1 - D1)/(L+r1)\}$$

$$-\theta_{LR} = \operatorname{atan}\{(-L \cdot \tan\theta_R + d1 + D1)/L\}$$

$$\theta_{LR} = \text{atan}\{(L \cdot \tan\theta_R - d2 - D1)/(L + r2)\}$$

$-\theta_{LR} = \text{atan}\{(-L \cdot \tan\theta_R + d2 + D1)/L\}$ $$\theta_{RL} = atan\{(L \cdot tan\theta_L + d1 + D2)/L\}$$

$-\theta_{RL} = \text{atan}\{(-L \cdot \tan\theta_L - d1 - D2)/(L + r1)\}$ $\theta_{RL} = \text{atan}\{(L \cdot \tan\theta_L + d2 + D2)/L\}$ $$-\theta_{RL} = \text{atan}\{(-L \cdot \tan\theta_L - d2 - D2)/(L + r2)\}$$

$$\theta_{RR} = \operatorname{atan}\{(L \cdot \tan\theta_R - d1 + D2)/(L + r1)\}$$

$$-\theta_{RR} = \operatorname{atan}\{(-L \cdot \tan\theta_R + d1 - D2)/L\}$$

$$\theta_{RR} = \operatorname{atan}\{(L \cdot \tan\theta_R - d2 + D2)/(L + r2)\}$$

$$-\theta_{RR} = \mathrm{atan}\{(-L \cdot \tan\theta_R + d2)/L\}$$

VEHICLE HEADLIGHT CONTROL DEVICE

TECHNICAL FIELD

The present invention relates to a vehicle headlight control device.

BACKGROUND ART

Patent Literature 1 describes a technique in which a direction range in which illumination provided by a headlight of the own vehicle needs to be suppressed is calculated in accordance with a position of a lighting device of a forward vehicle detected by a sensor. Specifically, according to Patent Literature 1, a direction range which is viewed from the headlight and in which illumination provided by the headlight needs to be suppressed is calculated by performing a conversion using a distance P from a center of the own vehicle to the headlight with respect to a position of a light source of the forward vehicle detected by the sensor.

CITATION LIST

Patent Literature

[PTL 1] JP 2013-184602 A

SUMMARY OF THE INVENTION

Technical Problem

According to the inventors' examination, however, a mounting position of the sensor is not necessarily the center of the vehicle, and thus, according to the technique described in Patent Literature 1, the direction range which is viewed from the headlight and in which illumination provided by the headlight needs to be suppressed may be inaccurate depending on the mounting position of the sensor.

In view of the above point, an object of the present invention is, in a technique in which a direction range in which illumination provided by a headlight of the own vehicle needs to be suppressed is calculated in accordance with a position of a lighting device of a forward vehicle detected by a sensor, to calculate with similar accuracy the direction range in which illumination provided by the headlight of the own vehicle needs to be suppressed, regardless of whether or not a mounting position of the sensor is a center of the vehicle.

Solution to Problem

The above object is achieved by a headlight control system which controls a headlight mounted in a predetermined lighting fixture mounting position in a vehicle, the headlight control system including: a range output section which acquires, from a sensor mounted in a predetermined sensor mounting position in the vehicle, a position of a target light source of a forward vehicle when viewed from the sensor mounting position, calculates, on a basis of an amount of position deviation between the lighting fixture mounting position and the sensor mounting position, a parallax-corrected direction of a target position when viewed from the lighting fixture mounting position, the target position being based on the acquired position of the target light source, and outputs, on a basis of the calculated parallax-corrected direction, a direction range which is viewed from the lighting fixture mounting position and in which illumination provided by the headlight needs to be suppressed; and a control section which controls the headlight on a basis of the direction range outputted by the range output section.

Thus, based on the amount of position deviation between the lighting fixture mounting position and the sensor mounting position, the range output section determines the direction range in which illumination provided by the headlight needs to be suppressed. Accordingly, regardless of whether or not a mounting position of the sensor is a center of the vehicle, the headlight control device can calculate with similar accuracy the direction range in which illumination provided by the headlight needs to be suppressed.

Note that reference signs in parentheses mentioned above and in the claims indicate a correspondence relationship between terms recited in the claims and, for example, concrete objects which are mentioned in embodiments described later and exemplify the terms.

DESCRIPTION OF THE EMBODIMENTS

Figure 1:
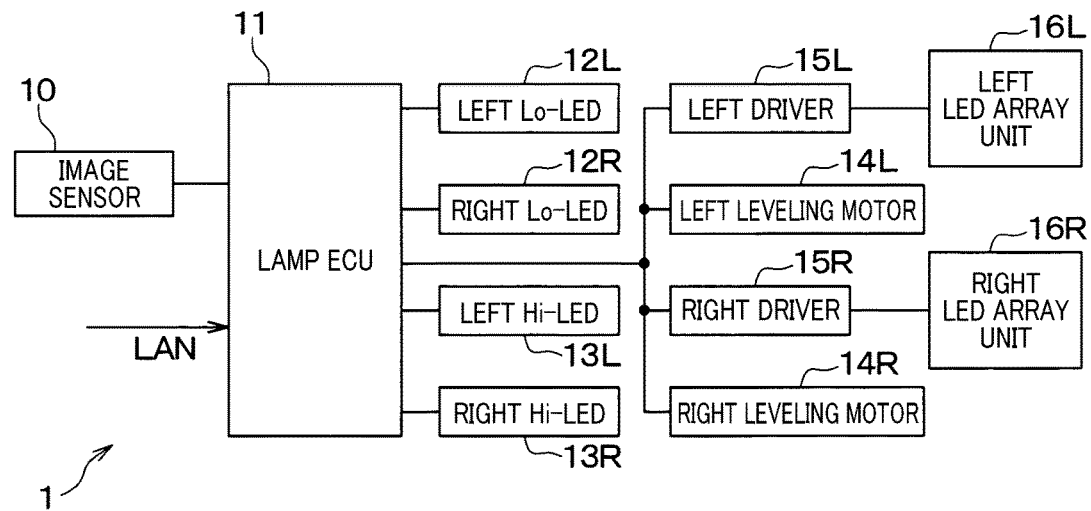
FIG. 1 is a schematic diagram of a vehicle headlight control system.

The following description will discuss an embodiment of the present invention. As illustrated in FIG. 1, a vehicle headlight control system in accordance with the present embodiment includes an image sensor 10, a lamp ECU 11, a left Lo-LED 12L, a right Lo-LED 12R, a left Hi-LED 13L, a right Hi-LED 13R, a left leveling motor 14L, a right leveling motor 14R, a left driver 15L, a right driver 15R, a left LED array unit 16L, and a right LED array unit 16R.

A headlight of a vehicle includes a left lighting fixture which is provided in a predetermined left lighting fixture mounting position at a front left end of the vehicle and a right lighting fixture which is provided in a predetermined right lighting fixture mounting position at a front right end of the vehicle. The left lighting fixture includes the LEDs 12L and 13L and the left LED array unit 16L, and the right lighting fixture includes the LEDs 12R and 13R and the right LED array unit 16R.

The image sensor 10 includes a camera section and a detection section. The camera section repeatedly (e.g., at regular time intervals of 1/30 seconds) photographs, for example, a road surface in front of the vehicle and sequentially outputs the resulting photographed image to the detection section.

The camera section is mounted in a predetermined sensor mounting position. The sensor mounting position can be a center of the vehicle in a lateral direction of the vehicle or can be a position deviated from the center of the vehicle in the lateral direction of the vehicle. The lateral direction of the vehicle is a direction orthogonal to both of a longitudinal direction and up-down direction of the vehicle. The longitudinal direction, up-down direction, and lateral direction of the vehicle are each a direction fixed to the vehicle.

In the case of the former, an amount of position deviation between the sensor mounting position and the left lighting fixture mounting position in the lateral direction of the vehicle is the same as an amount of position deviation between the sensor mounting position and the right lighting fixture mounting position in the lateral direction of the vehicle. In the case of the latter, the amount of position deviation between the sensor mounting position and the left lighting fixture mounting position in the lateral direction of the vehicle is different from the amount of position deviation between the sensor mounting position and the right lighting fixture mounting position in the lateral direction of the vehicle.

The detection section sequentially performs a well-known image recognition process with respect to the photographed image outputted from the camera section. Thus, based on a position and luminance of a light source (taillight of a preceding vehicle, headlight of an oncoming vehicle) shown in the photographed image, the detection section identifies a position, type, direction of travel, and distance from the own vehicle of one or a plurality of targets. A target to be detected is a vehicle in the photographed image. Information on the type of a target is information indicating whether the target is a large vehicle, a small vehicle, or a two-wheeled vehicle. Information on the direction of travel of a target is information indicating whether the target is a preceding vehicle which is traveling in a direction same as a direction in which the own vehicle is traveling or an oncoming vehicle which is traveling in a direction opposite to the direction in which the own vehicle is traveling.

The position of a target includes left coordinates which are position coordinates of a light source (taillight or headlight) provided on a left side of the target when viewed from the camera and right coordinates which are position coordinates of a light source (taillight or headlight) provided on a right side of the target when viewed from the camera. The left coordinates and the right coordinates are each position coordinates relative to a position of the camera.

The distance of a target from the own vehicle includes a right distance which is a distance from the own vehicle to a light source provided on a right side of the target and a left distance which is a distance from the own vehicle to a light source provided on a left side of the target. The detection section sequentially outputs, to the lamp ECU 11 as image sensor information, the information on the identified position, type, direction of travel, and distance from the own vehicle of each of the plurality of targets.

The lamp ECU 11 (corresponding to an example of a range output section) is a device which performs various types of control based on the image sensor information outputted from the image sensor 10 and various types of information received from an in-vehicle LAN. Specifically, the lamp ECU 11 controls turning ON and OFF of the LEDs 12L, 12R, 13L, and 13R and controls the leveling motors 14L and 14R. Furthermore, the lamp ECU 11 outputs a command to the left driver 15L and the right driver 15R. The lamp ECU 11 includes a CPU, a RAM, a ROM, and the like.

The CPU executes a program stored in the ROM, and when the program is executed, the RAM is used as a workspace.

Other than the program, the ROM stores, for example, data on position coordinates of the aforementioned left lighting fixture mounting position, right lighting fixture mounting position, and sensor mounting position. According to the ROM, the left lighting fixture mounting position and the right lighting fixture mounting position are deviated from each other only in the vehicle lateral direction and are not deviated from each other in the vehicle longitudinal direction or the vehicle up-down direction. Both of the lighting fixture mounting positions and the sensor mounting position are deviated from each other in the vehicle lateral direction and the vehicle up-down direction but are not deviated from each other in the vehicle longitudinal direction.

The left Lo-LED 12L is a light emitting diode which emits a low beam toward an area in front of the vehicle. Hereinafter, the light emitting diode is referred to as LED. The right Lo-LED 12R is an LED which emits a low beam toward the area in front of the vehicle. The left Hi-LED 13L is an LED which emits a high beam toward the area in front of the vehicle. The right Hi-LED 13R is an LED which emits a high beam toward the area in front of the vehicle. An optical axis of each of the LEDs 12L, 12R, 13L, and 13R is changeable only in the up-down direction with respect to the vehicle.

The left leveling motor 14L is an actuator which changes the optical axis of each of the LEDs 12L and 13L and an optical axis of each of LEDs of the left LED array unit 16L in the up-down direction of the vehicle. The right leveling motor 14R is an actuator which changes the optical axis of each of the LEDs 12R and 13R and an optical axis of each of LEDs of the right LED array unit 16R in the up-down direction of the vehicle.

The left driver 15L (corresponding to an example of a control section) is an electronic circuit which controls, for example, turning ON and OFF of the left LED array unit 16L based on a command outputted from the lamp ECU 11. The lamp ECU 11 includes the CPU, the RAM, the ROM, and the like. The CPU executes the program stored in the ROM, and when the program is executed, the RAM is used as a workspace.

The right driver 15R (corresponding to an example of the control section) is an electronic circuit which controls, for example, turning ON and OFF of the right LED array unit 16R based on a command outputted from the lamp ECU 11. The lamp ECU 11 includes the CPU, the RAM, the ROM, and the like. The CPU executes the program stored in the ROM, and when the program is executed, the RAM is used as a workspace.

Figure 2:
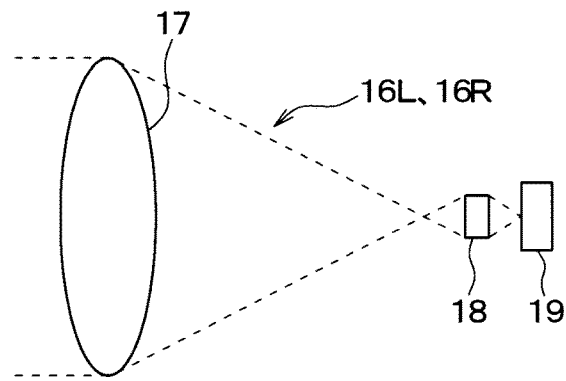
FIG. 2 is a schematic diagram of LED array units 16L and 16R.

The left LED array unit 16L has a configuration equivalent to that of the right LED array unit 16R. As illustrated in FIG. 2, the LED array units 16L and 16R each have a projection lens 17, a light guide lens group 18, and an LED array 19.

The projection lens 17 is a convex lens that is provided closer to a front side of the vehicle than the projection lens 17 and that focuses on a side closer to the projection lens 17 than to the light guide lens group 18. The light guide lens group 18 includes a plurality of (specifically, 11) light guide lenses which are arranged in a line at regular intervals in a vehicle left-right direction.

Figure 3:
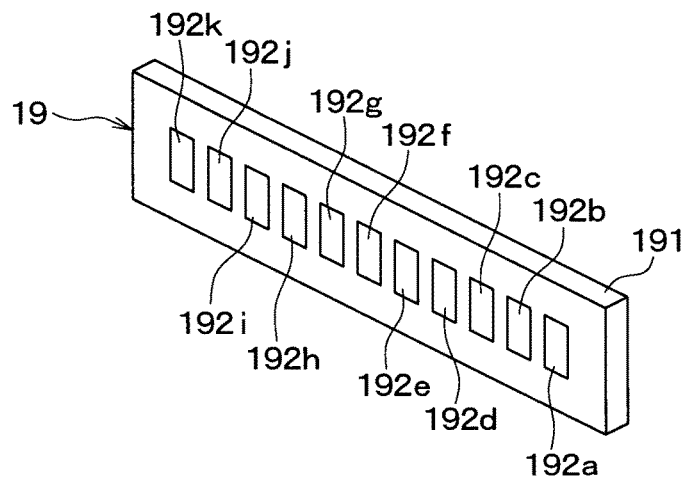
FIG. 3 is a schematic diagram of an LED array 19.

As illustrated in FIG. 3, the LED array 19 includes a substrate 191 which has a rectangular shape extending in the vehicle left-right direction and a plurality of LEDs 192a to 192k which are arranged on a side of the substrate which side is closer to the light guide lens group 18. The number of the LEDs 192a to 192k is the same as the number of the light guide lenses of the light guide lens group 18. The LEDs 192a to 192k are arranged in a line at regular intervals in the vehicle left-right direction. The left driver 15L controls turning ON and OFF of the LEDs 192a to 192k of the left LED array unit 16L, and the right driver 15R controls turning ON and OFF of the LEDs 192a to 192k of the right LED array unit 16R.

The LEDs 192a to 192k correspond one-to-one to the light guide lenses of the light guide lens group 18. Light emitted from any one of the LEDs 192a to 192k is magnified through the corresponding one of the light guide lenses and the projection lens 17, and is then illuminated on the area in front of the vehicle.

Variations in a light distribution state of the left lighting fixture will be described below. The light distribution state achieved by the left lighting fixture includes a light distribution state in a Lo mode, a light distribution state in a Hi mode, and a light distribution state in an S-Hi mode.

In the Lo mode, the left Lo-LED 12L is turned on, the left Hi-LED 13L is turned off, and the LEDs 192a to 192k of the left LED array unit 16L are all turned off. Consequently, when viewed from the left LED array unit 16L, an illumination range in which the road surface in front of the vehicle is illuminated with light emitted from the left lighting fixture is shaped as a range 31 in FIG. 4. The range 31 is a range which is illuminated by the left Lo-LED 12L.

Thus, the Lo mode is a beam mode that maximizes an effect of preventing glare for a forward vehicle by minimizing a range illuminated by the vehicle headlight.

Figure 5:
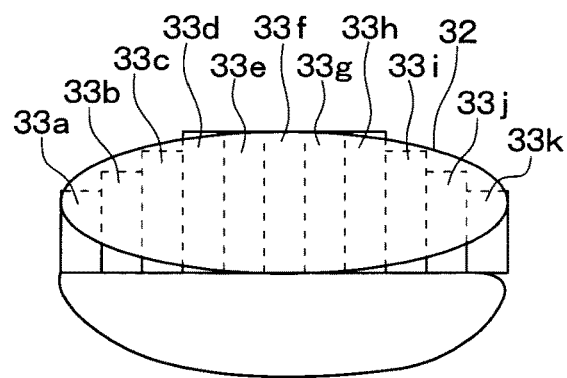
FIG. 5 is a view illustrating a light distribution state of the left lighting fixture in a Hi mode.

In the Hi mode, the left Lo-LED 12L is turned on, the left Hi-LED 13L is turned on, and the LEDs 192a to 192k of the left LED array unit 16L are all turned on. Consequently, when viewed from the left LED array unit 16L, the illumination range in which the road surface in front of the vehicle is illuminated with light emitted from the left lighting fixture has a shape formed by the range 31, a range 32, and ranges 33a to 33k overlapping with each other as illustrated in FIG. 5. The range 32 is a range which is illuminated by the left Hi-LED 13L. The ranges 33a to 33k are ranges illuminated by the respective LEDs 192a to 192k of the left LED array unit 16L.

Thus, the Hi mode is a beam mode that maximizes the range illuminated by the vehicle headlight.

In the S-Hi mode, the left Lo-LED 12L is turned on, the left Hi-LED 13L is turned off, and among the LEDs 192a to 192k of the left LED array unit 16L, some LEDs are turned on and all the other LEDs are turned off. Consequently, when viewed from the left LED array unit 16L, the illumination range in which the road surface in front of the vehicle is illuminated with light emitted from the left lighting fixture is a range as exemplified in FIG. 6.

Specifically, the illumination range has a shape formed by the range 31, the range 32, and only some of the ranges 33a to 33k overlapping with each other. According to the example in FIG. 6, among the LEDs 192a to 192k of the left LED array unit 16L, the LEDs 192a to 192f, 192j, and 192k are turned on and the LEDs 192g, 192h, and 192i are turned off so that a preceding vehicle 40 is not illuminated. Consequently, among the ranges 33a to 33k, the ranges 33a to 33f, 33j, and 33k are illuminated and the ranges 33g, 33h, and 33i are not illuminated. This makes it possible to prevent glare for the preceding vehicle 40.

In the S-Hi mode, among the LEDs 192a to 192k, a combination of some LEDs which are turned on and the other LEDs which are not turned on is changed in accordance with a position of the preceding vehicle 40. This makes it possible to change an illumination region which is illuminated with light emitted by the LEDs 192a to 192k and a light shielding region which is not illuminated with light emitted by the LEDs 192a to 192k in front of the vehicle.

Thus, the S-Hi mode is a beam mode that causes the range illuminated by the vehicle headlight to be larger than the range illuminated by the vehicle headlight in the Lo mode and that is capable of suppressing a deterioration in effect of preventing glare for the forward vehicle.

Figure 4:
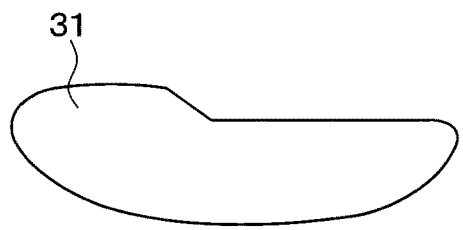
FIG. 4 is a view illustrating a light distribution state of a left lighting fixture in a Lo mode.
Figure 6:
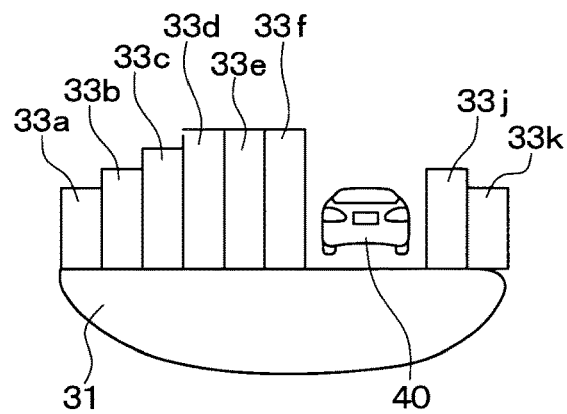
FIG. 6 is a view illustrating a light distribution state of the left lighting fixture in an S-Hi mode.

According to variations in a light distribution state of the right lighting fixture, illumination ranges in which the road surface in front of the vehicle is illuminated with light emitted from the right lighting fixture in the Lo mode, the Hi mode, and the S-Hi mode are bilaterally symmetrical with the ranges illustrated in FIGS. 4, 5, and 6, respectively. The light distribution states in the Lo mode, the Hi mode, and the S-Hi mode of the right lighting fixture can be described by replacing the left Lo-LED 12L, the left Hi-LED 13L, and the left LED array unit 16L with the right Lo-LED 12R, the right Hi-LED 13R, and the right LED array unit 16R, respectively, in the above description of the light distribution states in the Lo mode, the Hi mode, and the S-Hi mode of the left lighting fixture.

Figure 7:
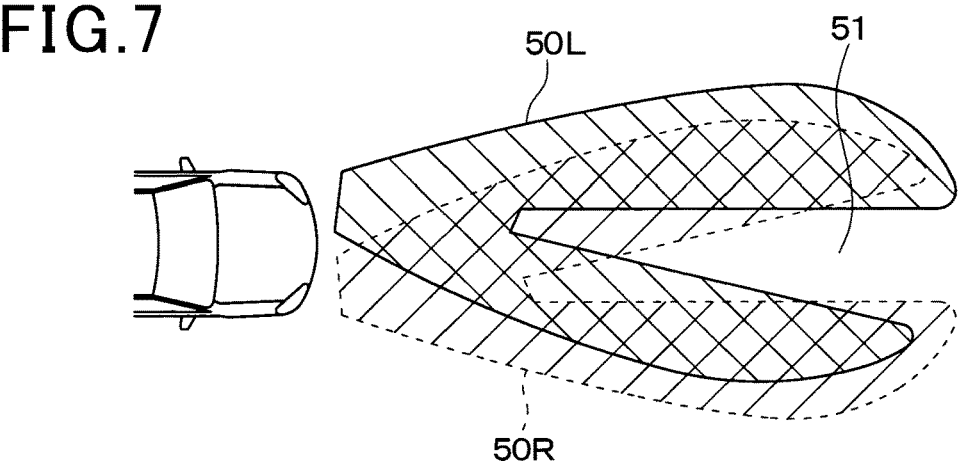
FIG. 7 is a view illustrating light distribution examples of the left lighting fixture and a right lighting fixture.

For example, as illustrated in FIG. 7, in the S-Hi mode, illumination ranges 50L and 50R which are illuminated with light emitted from the respective left lighting fixture and right lighting fixture are arranged such that a light shielding region 51 is formed between the illumination ranges 50L and 50R and the illumination ranges 50L and 50R partially overlap with each other when viewed from above the vehicle.

The following description will discuss specific activation of the vehicle headlight control system. First, according to the lamp ECU 11, the CPU reads the program from the ROM and executes the program so that a main process shown in FIG. 8 is repeatedly performed at regular time intervals (e.g., at time intervals of 50 milliseconds).

Figure 16:
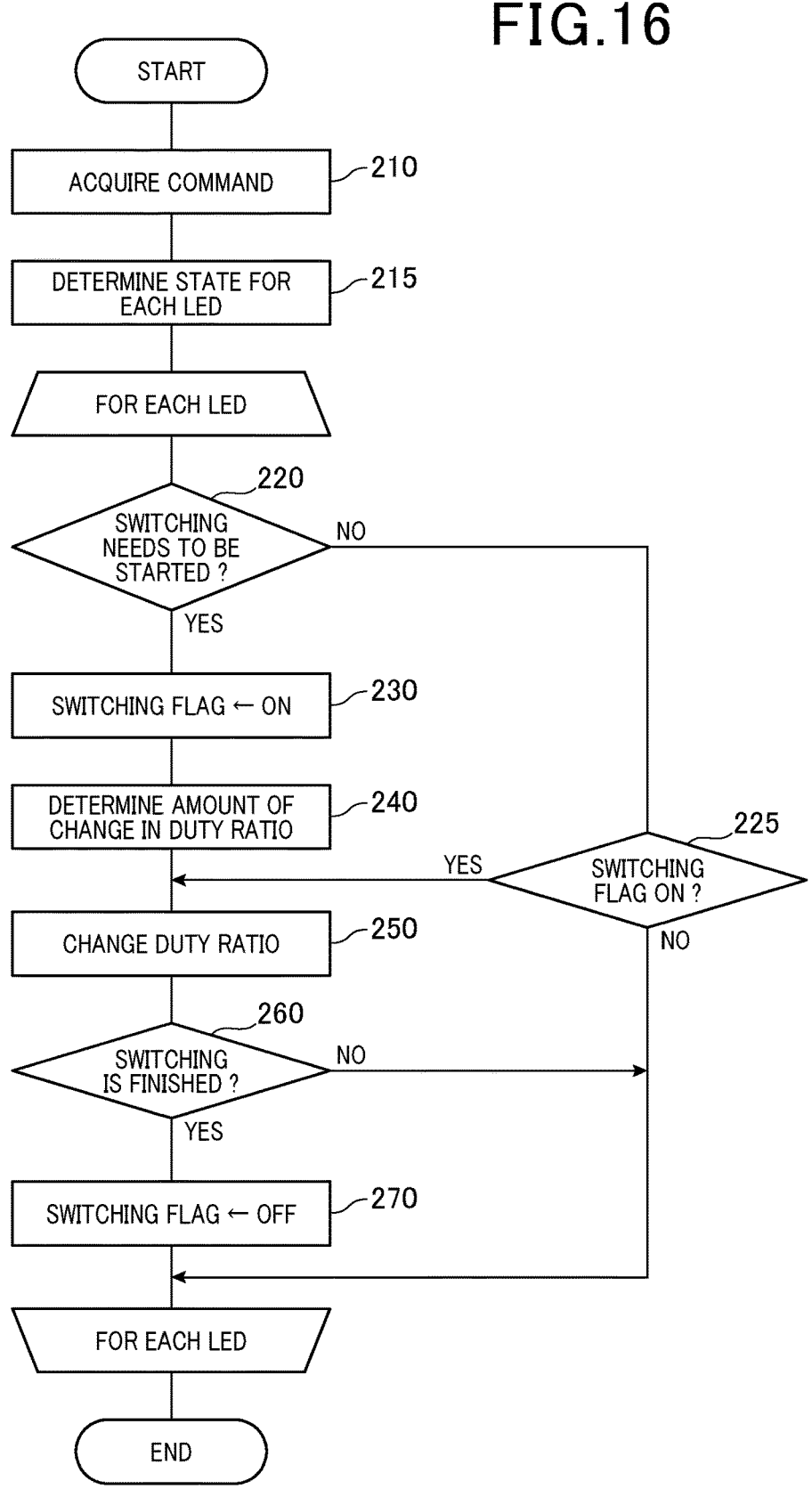
FIG. 16 is a flow chart of a process performed by a driver.

According to each of the left driver 15L and the right driver 15R, a CPU reads a program from a ROM and executes the program so that a process shown in FIG. 16 is repeatedly performed at regular time intervals. A period in which execution of the process in FIG. 10 is repeated can be the same as or different from a period in which execution of the process in FIG. 8 is repeated.

In the following description, a process performed by the CPU of the lamp ECU 11 is described as a process performed by the lamp ECU 11. A process performed by the CPU of each of the drivers 15L and 15R is described as a process performed by the corresponding one of the drivers 15L and 15R which includes the CPU.

Figure 8:
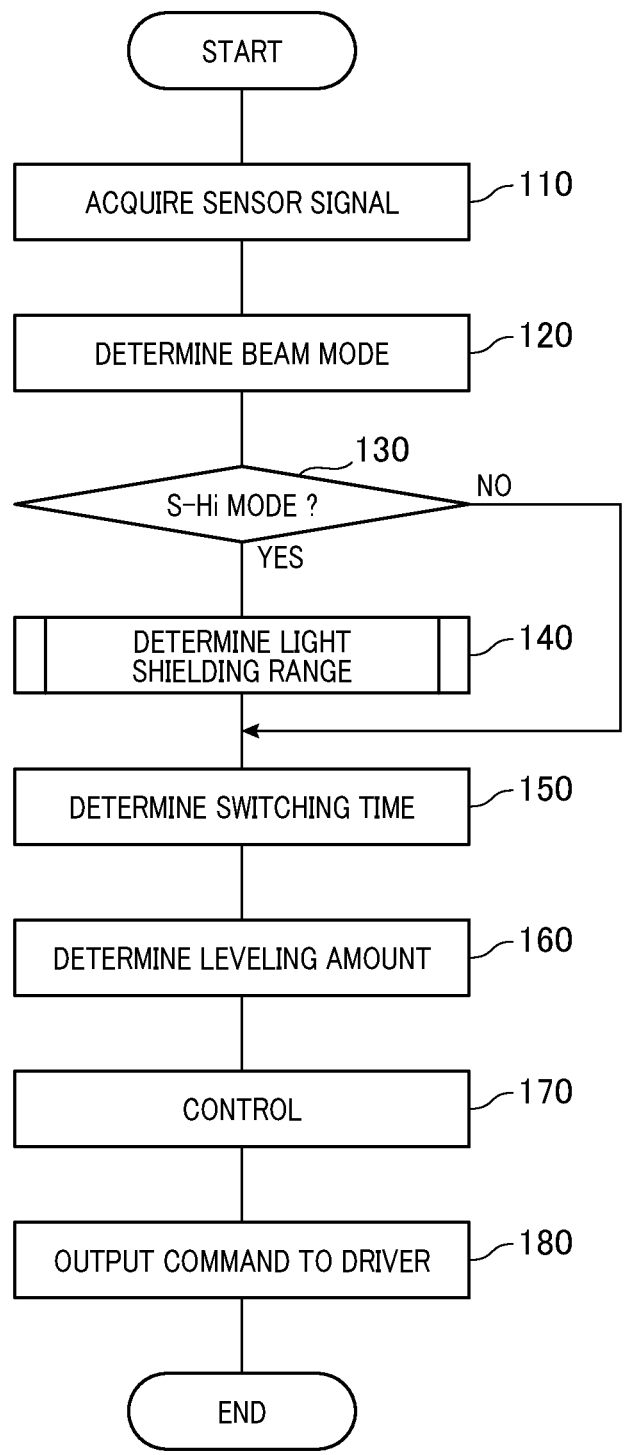
FIG. 8 is a flow chart of a main process performed by a lamp ECU.
Figures 9, 10, 11:
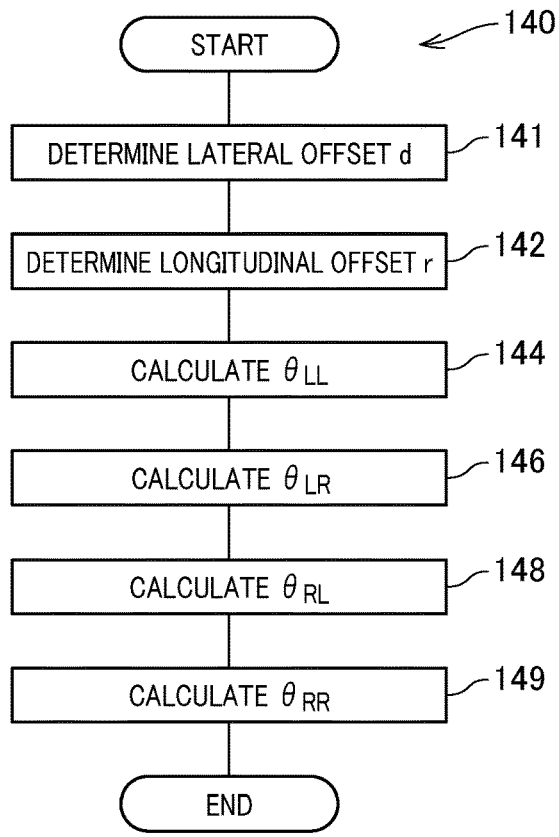
FIG. 9 is a flow chart of a process for determining a light shielding range.
FIG. 10 is a view showing a value of a lateral offset amount for each case.
FIG. 11 is a view showing a value of a longitudinal offset amount for each case.

According to the process in FIG. 8, the lamp ECU 11 first acquires in step 110 a sensor signal or the like. Specifically, the lamp ECU 11 acquires image sensor information outputted from the image sensor 10 and also acquires information from various sensors via the in-vehicle LAN.

Examples of the information acquired via the in-vehicle LAN include information as follows:
(1) Beam mode setting operation that a user in the vehicle has performed with respect to an operation section (e.g., mechanical switch) in the vehicle;
(2) Vehicle speed of the own vehicle;
(3) Current time;
(4) Current traveling area of the own vehicle.

The information (1) is outputted from the operation section to the in-vehicle LAN. With regard to the information (2), a value based on a vehicle speed pulse signal is outputted, to the in-vehicle LAN, from an ECU (e.g., body ECU) which acquires the vehicle speed pulse signal from a vehicle speed sensor provided in the own vehicle. The information (3) is outputted, to the in-vehicle LAN, from an ECU (e.g., body ECU) which measures a current time.

The information (4) is outputted, to the in-vehicle LAN, from a navigation ECU that acquires information on a current position from a GPS receiver provided in the own vehicle and that is capable of reading road map data. Specifically, based on current position coordinates of the own vehicle acquired from the GPS receiver, the navigation ECU identifies, from the road map data, a type of an area to which the current position coordinates belong. The navigation ECU then outputs the identified type of the area to the in-vehicle LAN as the information on the current traveling area of the own vehicle. The type of an area indicates whether or not the area is an urban area. For each set of position coordinates, information on whether the corresponding set of position coordinates is included in an urban area is stored in the road map data.

Subsequently, in step 120, a beam mode is determined. Specifically, the beam mode is switched to the Lo mode and a manual flag in the RAM is set to OFF when one or more of the following conditions (L1), (L2), and (L3) are satisfied:
(L1) The vehicle speed of the own vehicle acquired in the step 110 is not more than a reference speed (e.g., 20 km per hour);
(L2) The current time acquired in the step 110 is within a time period corresponding to daytime (e.g., after 9 a.m. and before 4 p.m.);
(L3) The current traveling area of the own vehicle acquired in the step 110 is the urban area.

In the step 120, the beam mode is switched to the Hi mode and the manual flag in the RAM is set to OFF when none of the above conditions (L1), (L2), and (L3) is satisfied and the following condition (H1) is satisfied:
(H1) The image sensor information acquired in the step 110 indicates that no target is present in the photographed image.

In the step 120, when none of the above conditions (L1), (L2), (L3), and (H1) is satisfied, the beam mode is switched to the S-Hi mode and the manual flag in the RAM is set to OFF. When none of the above conditions (L1), (L2), (L3), and (H1) is satisfied, the image sensor information acquired in the step 110 indicates that one or more targets are present in the photographed image.

Note, however, that in the step 120, regardless of the foregoing conditions for selecting the beam mode, if the beam mode setting operation acquired in the step 110 is an instruction for switching the beam mode to one of the Lo mode, the Hi mode, and the S-Hi mode, the beam mode is switched to the one of the Lo mode, the Hi mode, and the S-Hi mode and the manual flag in the RAM is set to ON.

Subsequently, in step 130, it is determined whether the mode set in the step 120 is the S-Hi mode. When the mode is the S-Hi mode, control proceeds to step 140. When the mode is not the S-Hi mode, control bypasses the step 140 and proceeds to step 150.

In the step 140, a light shielding range of each of the left LED array unit 16L and the right LED array unit 16R in the S-Hi mode is determined based on the image sensor information acquired in the step 110. The description below will discuss a case where the image sensor information acquired in the step 110 includes only left coordinates and right coordinates of a single target as position coordinates of the target, that is, a case where only one forward vehicle is present in the photographed image. In such a case, the left coordinates are position coordinates of a light source provided on a left side of the forward vehicle when viewed from the sensor mounting position relative to the sensor mounting position. The right coordinates are position coordinates of a light source provided on a right side of the forward vehicle when viewed from the sensor mounting position relative to the sensor mounting position.

In the step 140, based on the left coordinates and the right coordinates, a horizontal surface angle $\theta_{LL}$ at a left end of the light shielding range of the left LED array unit 16L when viewed from the left lighting fixture mounting position of the own vehicle and a horizontal surface angle $\theta_{LR}$ at a right end of the light shielding range of the left LED array unit 16L when viewed from the left lighting fixture mounting position of the own vehicle. In addition, based on the left coordinates and the right coordinates, a horizontal surface angle $\theta_{RL}$ at a left end of the light shielding range of the right LED array unit 16R when viewed from the right lighting fixture mounting position of the own vehicle and a horizontal surface angle $\theta_{RR}$ at a right end of the light shielding range of the right LED array unit 16R when viewed from the right lighting fixture mounting position of the own vehicle. A horizontal surface angle is an angle in a surface perpendicular to the up-down direction of the vehicle which angle is zero degrees at a forward side in the vehicle longitudinal direction and for which a counterclockwise direction is a positive direction.

A detailed process in the step 140 is as shown in FIG. 9. According to the process in the step 140, the lamp ECU 11 first determines in step 141 a value of a lateral offset amount d.

Specifically, based on information on a direction of travel of the target included in the image sensor information acquired in the last step 110, the lamp ECU 11 determines whether to use a preceding vehicle lateral offset amount d1 or an oncoming vehicle lateral offset amount d2 as the lateral offset amount. That is, when the information on the direction of travel indicates a preceding vehicle, the preceding vehicle lateral offset amount d1 is selected, and when the information on the direction of travel indicates an oncoming vehicle, the oncoming vehicle lateral offset amount d2 is selected.

When the preceding vehicle lateral offset amount d1 is selected, as shown in FIG. 10, a specific value of the preceding vehicle lateral offset amount d1 is determined based on information on a type of the target included in the image sensor information acquired in the last step 110.

That is, when the information on the type of the target indicates a large vehicle, a large preceding vehicle lateral offset amount d1_L is set as the value of the preceding vehicle lateral offset amount d1. When the information on the type of the target indicates a standard vehicle, a standard preceding vehicle lateral offset amount d1_M is set as the value of the preceding vehicle lateral offset amount d1. When the information on the type of the target indicates a two-wheeled vehicle, a two-wheeled preceding vehicle lateral offset amount d1_S is set as the value of the preceding vehicle lateral offset amount d1.

When the oncoming vehicle lateral offset amount d2 is selected, as shown in FIG. 10, a specific value of the oncoming vehicle lateral offset amount d2 is determined based on the information on the type of the target included in the image sensor information acquired in the last step 110.

That is, when the information on the type of the target indicates a large vehicle, a large oncoming vehicle lateral offset amount d2_L is set as the value of the oncoming vehicle lateral offset amount d2. When the information on the type of the target indicates a standard vehicle, a standard oncoming vehicle lateral offset amount d2_M is set as the value of the oncoming vehicle lateral offset amount d2. When the information on the type of the target indicates a two-wheeled vehicle, a two-wheeled oncoming vehicle lateral offset amount d2_S is set as the value of the oncoming vehicle lateral offset amount d2.

The values of the lateral offset amounts d1_L, d1_M, d1_S, d2_L, d2_M, and d2_S are all stored in advance in the ROM of the lamp ECU 11. A magnitude relation of the lateral offset amounts can be, for example, d1_L>d1_M>d1_S>d2_L>d2_M>d2_S.

The lateral offset amount is an amount of offset for expanding the light shielding range in the vehicle lateral direction so that not only an inside of the forward vehicle is not illuminated by the LED array units 16L and 16R of the own vehicle but also a side mirror of the forward vehicle (door mirror in the case of four-wheeled vehicle, side mirror in the case of two-wheeled vehicle) is not illuminated by the LED array units 16L and 16R of the own vehicle. When the side mirror of the forward vehicle is illuminated, a driver of the preceding vehicle may be dazzled. As described above, therefore, as the forward vehicle is larger, the lateral offset amount is set to be larger. A driver of the oncoming vehicle is less likely to be dazzled by light illuminating the side mirror, and thus the oncoming vehicle lateral offset amount d2 is set to be smaller than the preceding vehicle lateral offset amount d1. That is, the lamp ECU 11 switches the lateral offset amount depending on whether the forward vehicle is a preceding vehicle or an oncoming vehicle.

Subsequently, in step 142, the lamp ECU 11 determines a value of a longitudinal offset amount r. Specifically, based on the information on the direction of travel of the target included in the image sensor information acquired in the last step 110, the lamp ECU 11 determines whether to use a preceding vehicle longitudinal offset amount r1 or an oncoming vehicle longitudinal offset amount r2 as the longitudinal offset amount. That is, when the information on the direction of travel indicates a preceding vehicle, the preceding vehicle longitudinal offset amount r1 is selected, and when the information on the direction of travel indicates an oncoming vehicle, the oncoming vehicle longitudinal offset amount r2 is selected.

When the preceding vehicle longitudinal offset amount r1 is selected, as shown in FIG. 11, a specific value of the preceding vehicle longitudinal offset amount r1 is determined based on the information on the type of the target included in the image sensor information acquired in the last step 110.

That is, when the information on the type of the target indicates a large vehicle, a large preceding vehicle longitudinal offset amount r1_L is set as the value of the preceding vehicle longitudinal offset amount r1. When the information on the type of the target indicates a standard vehicle, a standard preceding vehicle longitudinal offset amount r1_M is set as the value of the preceding vehicle longitudinal offset amount r1. When the information on the type of the target indicates a two-wheeled vehicle, a two-wheeled preceding vehicle longitudinal offset amount r1_S is set as the value of the preceding vehicle longitudinal offset amount r1.

When the oncoming vehicle longitudinal offset amount r2 is selected, as shown in FIG. 11, a specific value of the oncoming vehicle longitudinal offset amount r2 is determined based on the information on the type of the target included in the image sensor information acquired in the last step 110.

That is, when the information on the type of the target indicates a large vehicle, a large oncoming vehicle longitudinal offset amount r2_L is set as the value of the oncoming vehicle longitudinal offset amount r2. When the information on the type of the target indicates a standard vehicle, a standard oncoming vehicle longitudinal offset amount r2_M is set as the value of the oncoming vehicle longitudinal offset amount r2. When the information on the type of the target indicates a two-wheeled vehicle, a two-wheeled oncoming vehicle longitudinal offset amount r2_S is set as the value of the oncoming vehicle longitudinal offset amount r2.

The values of the longitudinal offset amounts r1_L, r1_M, r1_S, r2_L, r2_M, and r2_S are all stored in advance in the ROM of the lamp ECU 11. A magnitude relation of the longitudinal offset amounts can be, for example, r1_L>r1_M>r1_S>r2_L>r2_M>r2_S.

The longitudinal offset amount is an amount of offset for expanding the light shielding range in the vehicle longitudinal direction so that not only the inside of the forward vehicle is not illuminated by the LED array units 16L and 16R of the own vehicle but also the side mirror of the forward vehicle (door mirror in the case of four-wheeled vehicle, side mirror in the case of two-wheeled vehicle) is not illuminated by the LED array units 16L and 16R of the own vehicle. As described above, therefore, as the forward vehicle is larger, the longitudinal offset amount is set to be larger. In general, an amount of position deviation from a light source (taillight) of a preceding vehicle to a side mirror of the preceding vehicle in the vehicle longitudinal direction is greater than an amount of position deviation from a light source (taillight) of an oncoming vehicle to a side mirror of the oncoming vehicle in the vehicle longitudinal direction. Accordingly, the oncoming vehicle longitudinal offset amount d2 (d2_L, d2_M, d2_S) is set to be smaller than the preceding vehicle longitudinal offset amount d1 (d1_L, d1_M, d1_S).

Subsequently, in step 144, a horizontal surface interior angle $\theta_{LL}$ is calculated. A method for calculating the horizontal surface interior angle $\theta_{LL}$ varies depending on whether the forward vehicle is a preceding vehicle or an oncoming vehicle and whether a base amount $X_{LL}$ is positive or negative. Identification of whether the forward vehicle is a preceding vehicle or an oncoming vehicle is performed based on the information on the type of the target included in the image sensor information acquired in the last step 110.

Figure 12A:
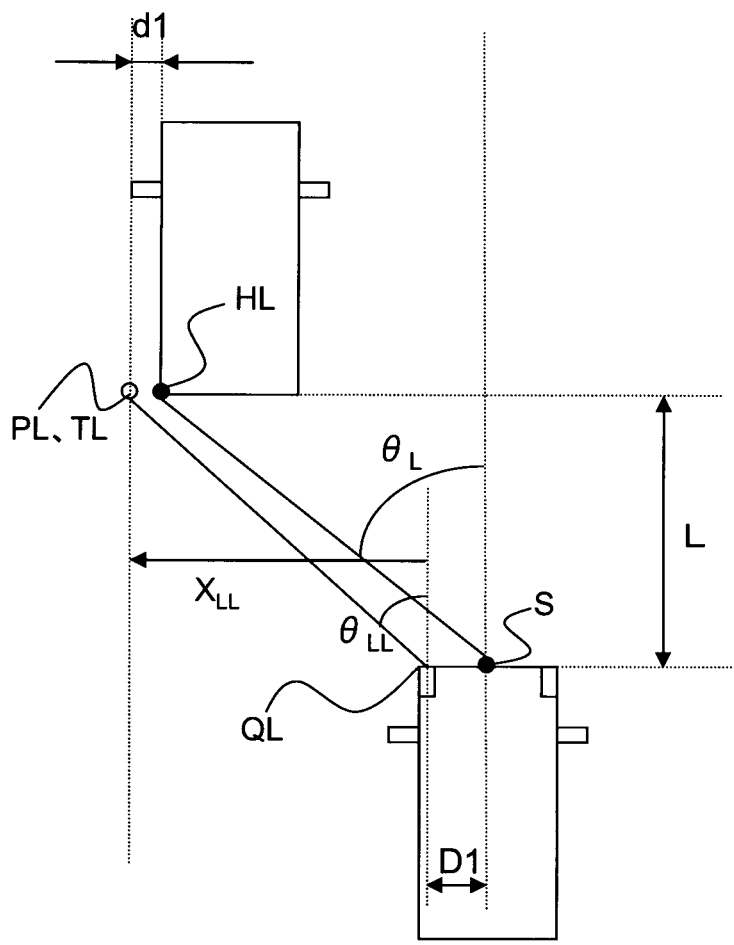
FIG. 12A is a view showing a method for calculating a horizontal surface interior angle $\theta_{LL}$ when a forward vehicle is a preceding vehicle and a base amount $X_{LL}$ is positive.
Figure 12B:
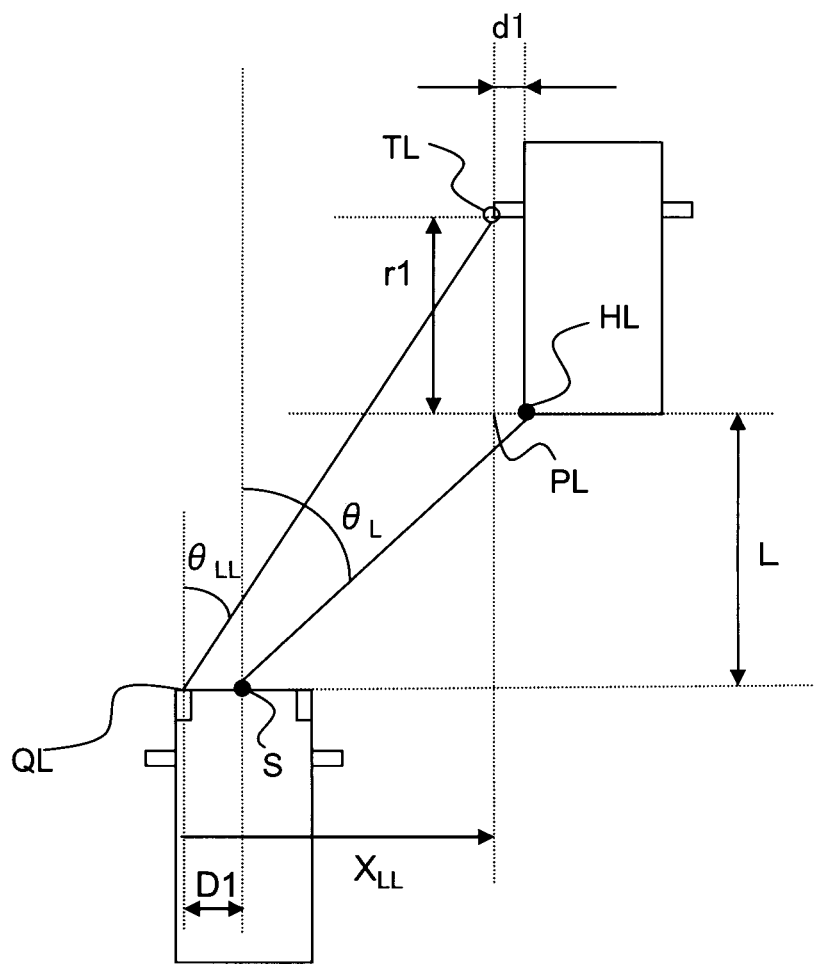
FIG. 12B is a view showing a method for calculating the horizontal surface interior angle $\theta_{LL}$ when the forward vehicle is a preceding vehicle and the base amount $X_{LL}$ is negative.

The base amount $X_{LL}$ is an amount which is positive in a case where a base position PL which is offset by the lateral offset amount d from a light source HL on a left side of the forward vehicle to a left side in the vehicle left-right direction is deviated to the left side in the vehicle left-right direction when viewed from a left lighting fixture mounting position QL of the vehicle and is negative in a case where the base position PL is deviated to a right side in the vehicle left-right direction when viewed from the left lighting fixture mounting position QL. Specifically, when the forward vehicle is a preceding vehicle, as shown in FIGS. 12A and 12B, the base amount $X_{LL}$ is calculated by the following formula.

$$X_{LL}=L\times\tan(\theta_L)+d1-D1$$

Figure 12C:
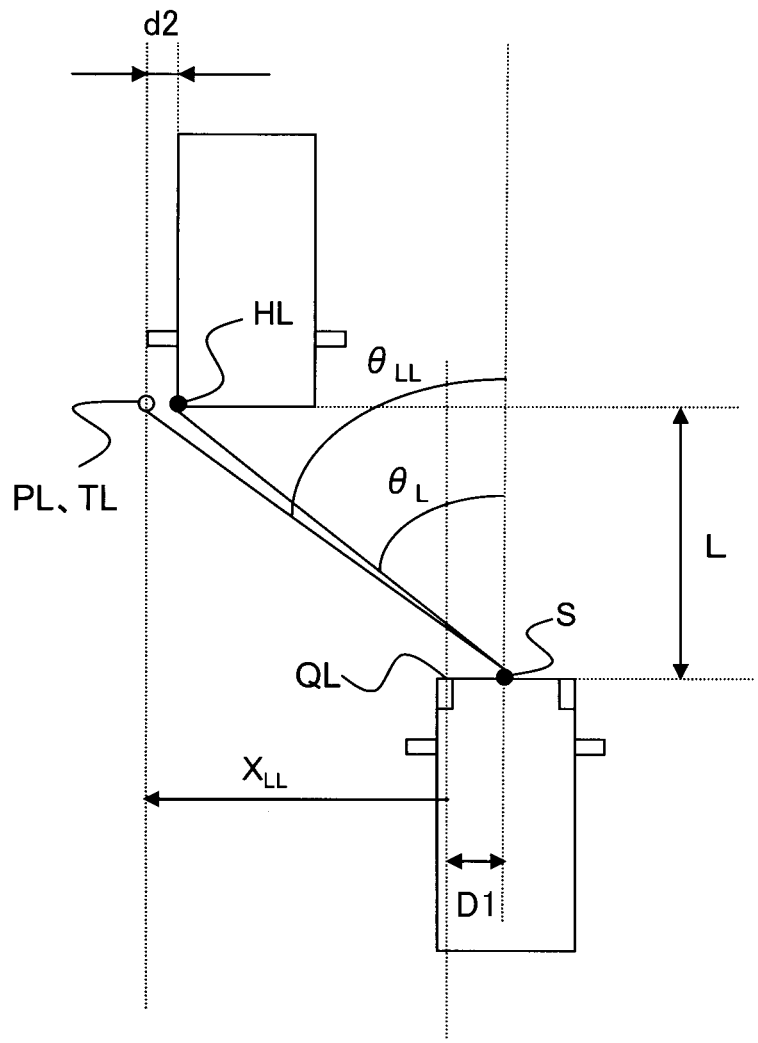
FIG. 12C is a view showing a method for calculating the horizontal surface interior angle $\theta_{LL}$ when the forward vehicle is an oncoming vehicle and the base amount $X_{LL}$ is positive.
Figure 12D:
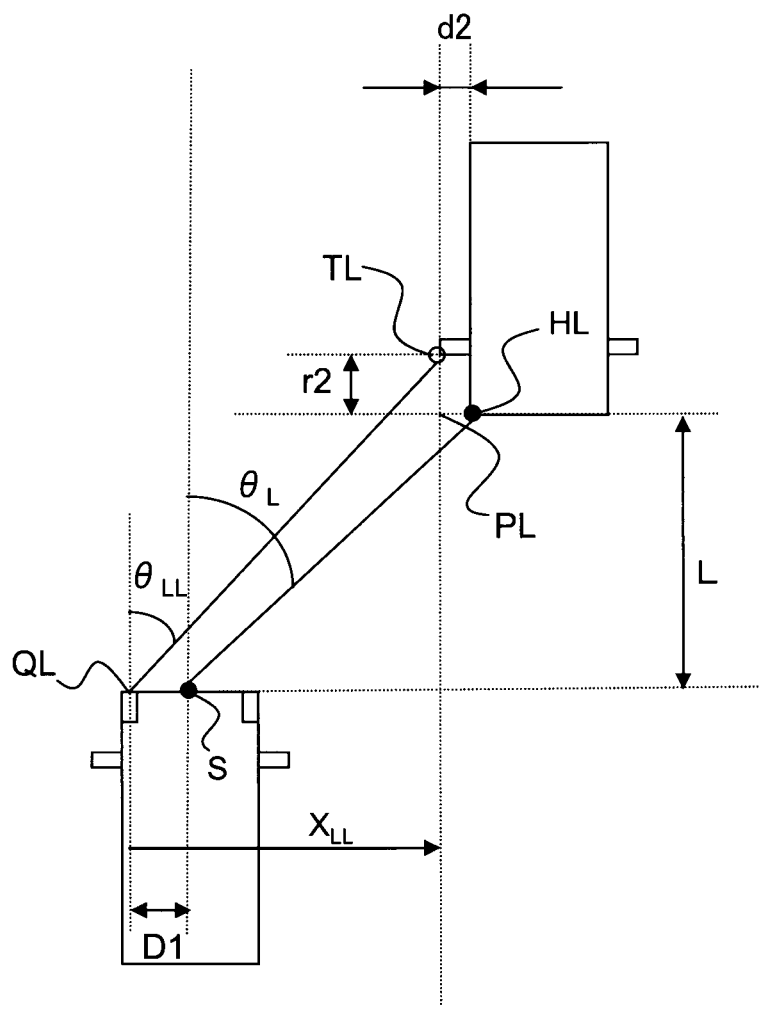
FIG. 12D is a view showing a method for calculating the horizontal surface interior angle $\theta_{LL}$ when the forward vehicle is an oncoming vehicle and the base amount $X_{LL}$ is negative.

When the forward vehicle is an oncoming vehicle, as shown in FIGS. 12C and 12D, the base amount $X_{LL}$ is calculated by the following formula.

$$X_{LL}=L\times\tan(\theta_L)+d2-D1$$

Note that d1 and d2 are each the lateral offset amount determined in the step 141. An amount L is a distance between vehicles which corresponds to an amount of deviation of an end of the forward vehicle on a side of the own vehicle (rear end of the preceding vehicle, front end of the oncoming vehicle) in the vehicle longitudinal direction with respect to a sensor mounting position S. The distance between vehicles L is identified, for example, based on a detection signal of a vehicle distance sensor (e.g., millimeter wave radar, laser radar) not shown. Furthermore, $\theta_L$ is a horizontal surface interior angle of the light source HL on the left side of the forward vehicle when viewed from the sensor mounting position S, and $\theta_L$ is identified based on the left coordinates in the image sensor information acquired in the last step 110, for example, with use of a corresponding table stored in advance in the ROM.

An amount D1 is an absolute value of an amount of position deviation of the left lighting fixture mounting position QL in the vehicle lateral direction with respect to the sensor mounting position S. A value of the absolute value D1 of the amount of deviation can be determined based on the values of the sensor mounting position and the left lighting fixture mounting position stored in the ROM. Alternatively, when a value of the absolute value D1 of the amount of deviation is stored in the ROM of the lamp ECU 11, a value of the absolute value D1 of the amount of deviation can be determined by reading the value stored in the ROM.

When the forward vehicle is a preceding vehicle and the base amount $X_{LL}$ is positive, as shown in FIG. 12A, the horizontal surface interior angle $\theta_{LL}$ is calculated by the following formula.

$$\theta_{LL}=a\tan\{(L\cdot\tan\theta_L+d1-D1)/L\}$$

In this case, the horizontal surface interior angle $\theta_{LL}$ is a horizontal surface interior angle indicating a direction of a target position TL when viewed from the left lighting fixture mounting position QL and indicates a parallax-corrected direction acquired after performing a parallax correction with respect to the horizontal surface interior angle $\theta_L$. In this case, the target position TL is located in the same position as the base position PL. That is, the longitudinal offset amount calculated in the step 142 is not used for the parallax correction. This is because if the longitudinal offset amount is used for the parallax correction, the forward vehicle is illuminated and this may cause dazzling of the driver of the forward vehicle.

When the forward vehicle is a preceding vehicle and the base amount $X_{LL}$ is negative, as shown in FIG. 12B, the horizontal surface interior angle $\theta_{LL}$ is calculated by the following formula.

$$-\theta_{LL}=a\tan\{(-L\cdot\tan\theta_L-d1+D1)/(L+r1)\}$$

An amount r1 is the preceding vehicle longitudinal offset amount calculated in the step 142. In this case, the horizontal surface interior angle $\theta_{LL}$ is a horizontal surface interior angle indicating a direction of the target position TL when viewed from the left lighting fixture mounting position QL and indicates a parallax-corrected direction acquired after performing the parallax correction with respect to the horizontal surface interior angle $\theta_L$. In this case, the target position TL is a position deviated by the longitudinal offset amount r1 forward in the vehicle longitudinal direction from the base position PL.

When the forward vehicle is an oncoming vehicle and the base amount $X_{LL}$ is positive, as shown in FIG. 12C, the horizontal surface interior angle $\theta_{LL}$ is calculated by the following formula.

$$\theta_{LL}=a\tan\{(L\cdot\tan\theta_L+d2)/L\}$$

In this case, the horizontal surface interior angle $\theta_{LL}$ is a horizontal surface interior angle indicating a direction of the target position TL when viewed not from the left lighting fixture mounting position QL but from the sensor mounting position S. That is, no parallax correction is performed in accordance with the position deviation between the left lighting fixture mounting position QL and the sensor mounting position S. In this case, the target position TL is located in the same position as the base position PL.

When the forward vehicle is an oncoming vehicle and the base amount $X_{LL}$ is negative, as shown in FIG. 12D, the horizontal surface interior angle $\theta_{LL}$ is calculated by the following formula.

$$-\theta_{LL} = a\tan\{(-L\cdot\tan\theta_L - d2 + D1)/(L + r2)\}$$

An amount r2 is the oncoming vehicle longitudinal offset amount calculated in the step 142. In this case, the horizontal surface interior angle $\theta_{LL}$ is a horizontal surface interior angle indicating a direction of the target position TL when viewed from the left lighting fixture mounting position QL and indicates a parallax-corrected direction acquired after performing the parallax correction with respect to the horizontal surface interior angle $\theta_L$. In this case, the target position TL is a position deviated by the longitudinal offset amount r2 forward in the vehicle longitudinal direction from the base position PL.

Subsequently, in step 146, a horizontal surface interior angle $\theta_{LR}$ is calculated. A method for calculating the horizontal surface interior angle $\theta_{LR}$ varies depending on whether the forward vehicle is a preceding vehicle or an oncoming vehicle and whether a base amount $X_{LR}$ is positive or negative.

Figure 13A:
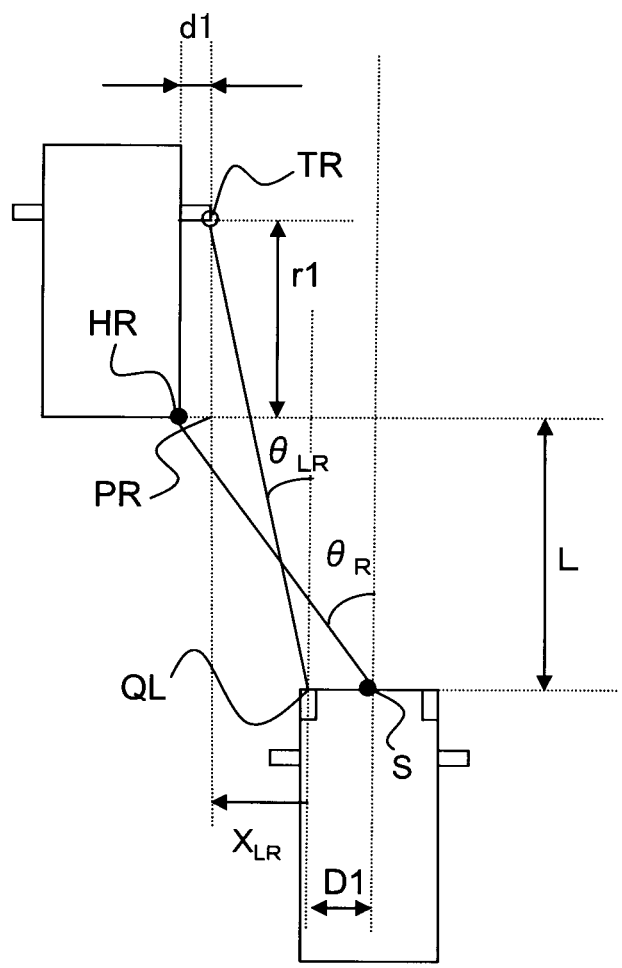
FIG. 13A is a view showing a method for calculating a horizontal surface interior angle $\theta_{LR}$ when the forward vehicle is a preceding vehicle and a base amount $X_{LR}$ is positive.
Figure 13B:
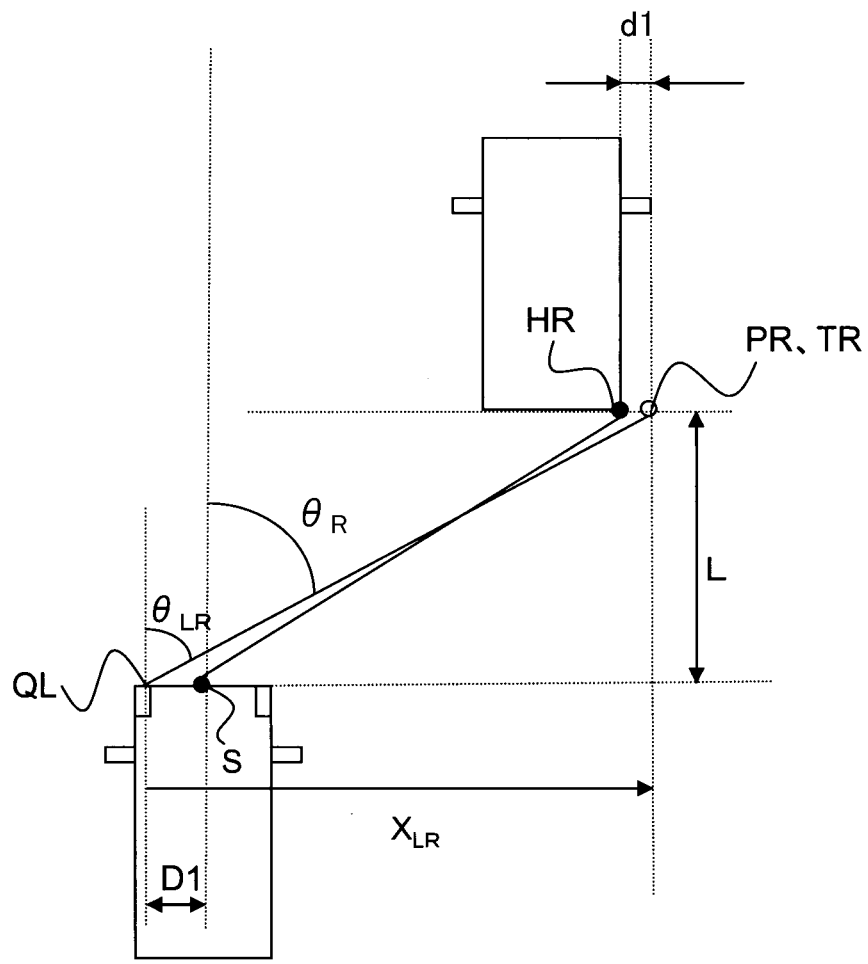
FIG. 13B is a view showing a method for calculating the horizontal surface interior angle $\theta_{LR}$ when the forward vehicle is a preceding vehicle and the base amount $X_{LR}$ is negative.

The base amount $X_{LR}$ is an amount which is positive in a case where a base position PR which is offset by the lateral offset amount d from a light source HR on a right side of the forward vehicle to the right side in the vehicle left-right direction is deviated to the left side in the vehicle left-right direction when viewed from the left lighting fixture mounting position QL of the vehicle and is negative in a case where the base position PR is deviated to the right side in the vehicle left-right direction when viewed from the left lighting fixture mounting position QL. Specifically, when the forward vehicle is a preceding vehicle, as shown in FIGS. 13A and 13B, the base amount $X_{LR}$ is calculated by the following formula.

$$X_{LR} = L \times \tan(\theta_R) - d1 - D1$$

Figure 13C:
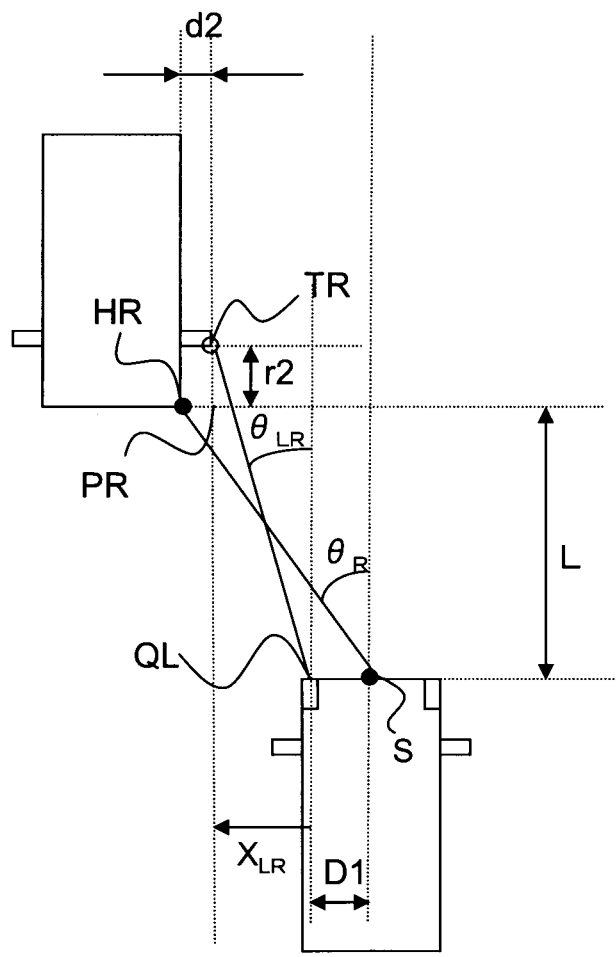
FIG. 13C is a view showing a method for calculating the horizontal surface interior angle $\theta_{LR}$ when the forward vehicle is an oncoming vehicle and the base amount $X_{LR}$ is positive.
Figure 13D:
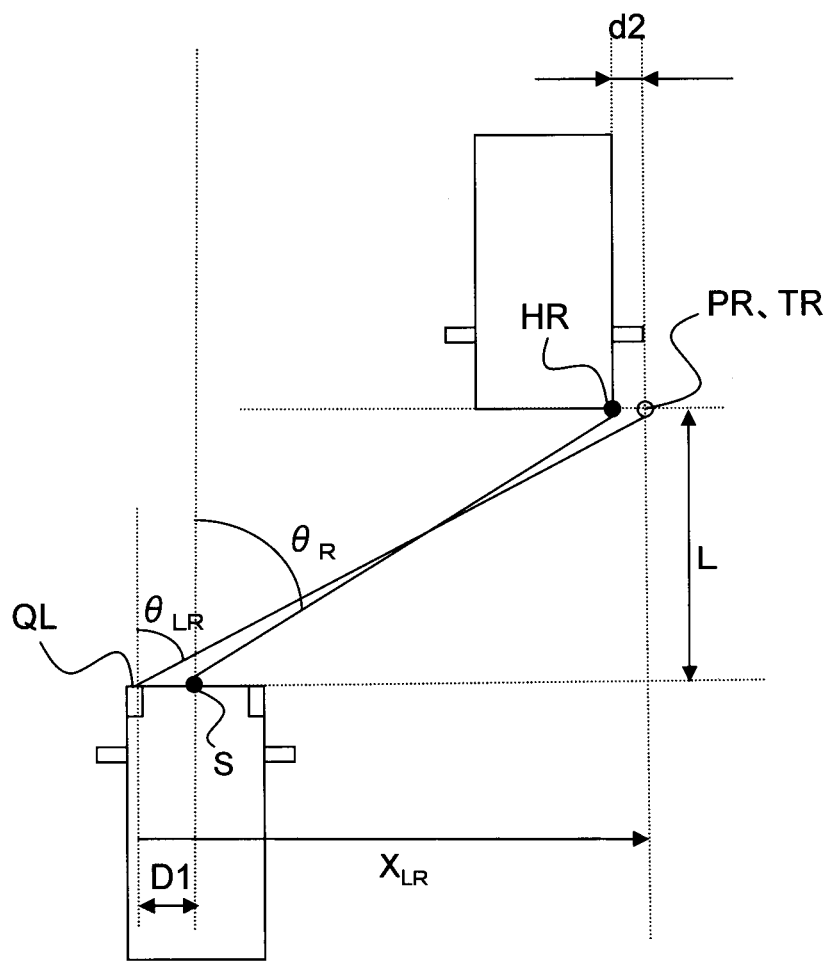
FIG. 13D is a view showing a method for calculating the horizontal surface interior angle $\theta_{LR}$ when the forward vehicle is an oncoming vehicle and the base amount $X_{LR}$ is negative.

When the forward vehicle is an oncoming vehicle, as shown in FIGS. 13C and 13D, the base amount $X_{LR}$ is calculated by the following formula.

$$X_{LR} = L \times \tan(\theta_L) - d2 - D1$$

Note that $\theta_R$ is a horizontal surface interior angle of the light source HR on the right side of the forward vehicle when viewed from the sensor mounting position S, and $\theta_R$ is identified based on the right coordinates in the image sensor information acquired in the last step 110, for example, with use of the corresponding table stored in advance in the ROM.

When the forward vehicle is a preceding vehicle and the base amount $X_{LR}$ is positive, as shown in FIG. 13A, the horizontal surface interior angle $\theta_{LR}$ is calculated by the following formula.

$$\theta_{LR} = a\tan\{(L\cdot\tan\theta_R - d1 - D1)/(L + r1)\}$$

The amount r1 is the preceding vehicle longitudinal offset amount calculated in the step 142. In this case, the horizontal surface interior angle $\theta_{LR}$ is a horizontal surface interior angle indicating a direction of a target position TR when viewed from the left lighting fixture mounting position QL and indicates a parallax-corrected direction acquired after performing the parallax correction with respect to the horizontal surface interior angle $\theta_R$. In this case, the target position TR is a position deviated by the longitudinal offset amount r1 forward in the vehicle longitudinal direction from the base position PR.

When the forward vehicle is a preceding vehicle and the base amount $X_{LR}$ is negative, as shown in FIG. 13B, the horizontal surface interior angle $\theta_{LR}$ is calculated by the following formula.

$$-\theta_{LR} = a\tan\{(-L\cdot\tan\theta_R + d1 + D1)/L\}$$

In this case, the horizontal surface interior angle $\theta_{LR}$ is a horizontal surface interior angle indicating a direction of the target position TR when viewed from the left lighting fixture mounting position QL and indicates a parallax-corrected direction acquired after performing the parallax correction with respect to the horizontal surface interior angle $\theta_R$. In this case, the target position TR is located in the same position as the base position PR. That is, the longitudinal offset amount calculated in the step 142 is not used for the parallax correction.

When the forward vehicle is an oncoming vehicle and the base amount $X_{LR}$ is positive, as shown in FIG. 13C, the horizontal surface interior angle $\theta_{LR}$ is calculated by the following formula.

$$\theta_{LR} = a\tan\{(L\cdot\tan\theta_R - d2 - D1)/(L + r2)\}$$

The amount r2 is the oncoming vehicle longitudinal offset amount calculated in the step 142. In this case, the horizontal surface interior angle $\theta_{LR}$ is a horizontal surface interior angle indicating a direction of the target position TR when viewed from the left lighting fixture mounting position QL and indicates a parallax-corrected direction acquired after performing the parallax correction with respect to the horizontal surface interior angle $\theta_R$. In this case, the target position TR is a position deviated by the longitudinal offset amount r2 forward in the vehicle longitudinal direction from the base position PR.

When the forward vehicle is an oncoming vehicle and the base amount $X_{LR}$ is negative, as shown in FIG. 13D, the horizontal surface interior angle $\theta_{LR}$ is calculated by the following formula.

$$-\theta_{LR} = a\tan\{(-L\cdot\tan\theta_R + d2 + D1)/L\}$$

In this case, the horizontal surface interior angle $\theta_{LR}$ is a horizontal surface interior angle indicating a direction of the target position TR when viewed from the left lighting fixture mounting position QL and indicates a parallax-corrected direction acquired after performing the parallax correction with respect to the horizontal surface interior angle $\theta_R$. In this case, the target position TL is located in the same position as the base position PL.

Subsequently, in step 148, a horizontal surface interior angle $\theta_{RL}$ is calculated. A method for calculating the horizontal surface interior angle $\theta_{RL}$ varies depending on whether the forward vehicle is a preceding vehicle or an oncoming vehicle and whether a base amount $X_{RL}$ is positive or negative.

Figure 14A:
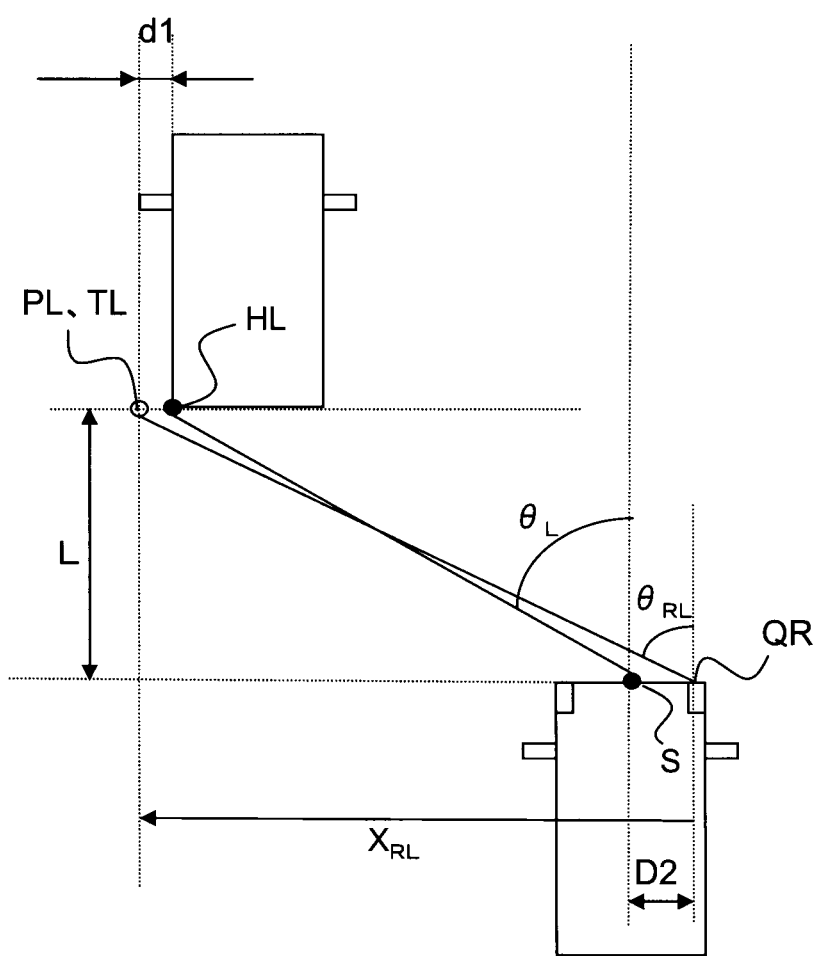
FIG. 14A is a view showing a method for calculating a horizontal surface interior angle $\theta_{RL}$ when the forward vehicle is a preceding vehicle and a base amount $X_{RL}$ is positive.
Figure 14B:
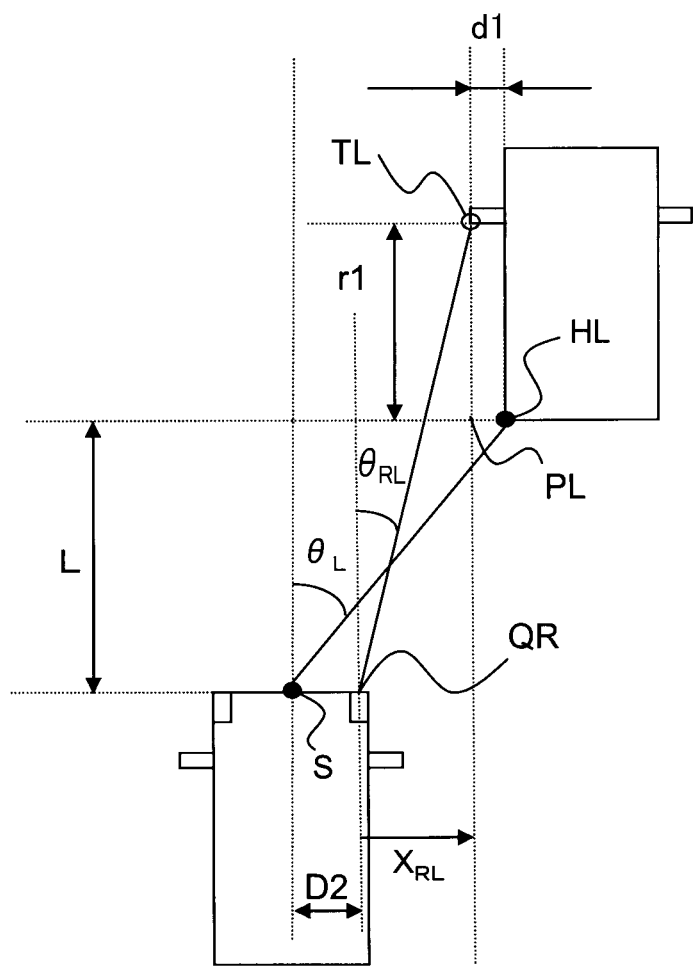
FIG. 14B is a view showing a method for calculating the horizontal surface interior angle $\theta_{RL}$ when the forward vehicle is a preceding vehicle and the base amount $X_{RL}$ is negative.

The base amount $X_{RL}$ is an amount which is positive in a case where the base position PL which is offset by the lateral offset amount d from the light source HL on the left side of the forward vehicle to the left side in the vehicle left-right direction is deviated to the left side in the vehicle left-right direction when viewed from a right lighting fixture mounting position QR of the vehicle and is negative in a case where the base position PL is deviated to the right side in the vehicle left-right direction when viewed from the right lighting fixture mounting position QR. Specifically, when the forward vehicle is a preceding vehicle, as shown in FIGS. 14A and 14B, the base amount $X_{RL}$ is calculated by the following formula.

$$X_{RL}=L \times \tan(\theta_L)+d1+D2$$

Figure 14C:
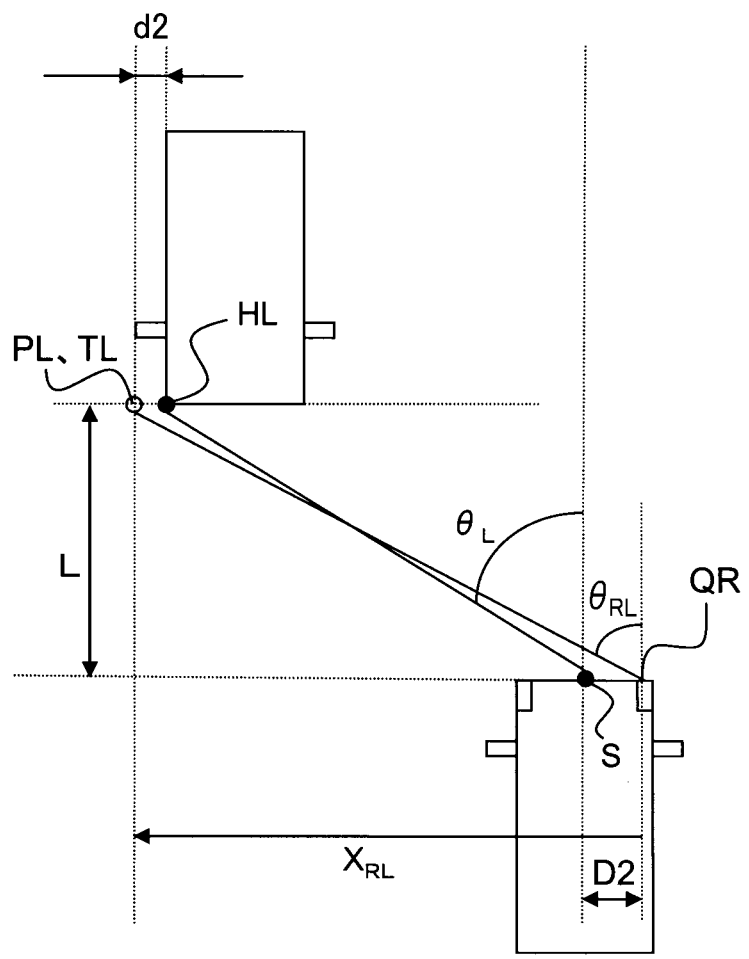
FIG. 14C is a view showing a method for calculating the horizontal surface interior angle $\theta_{RL}$ when the forward vehicle is an oncoming vehicle and the base amount $X_{RL}$ is positive.
Figure 14D:
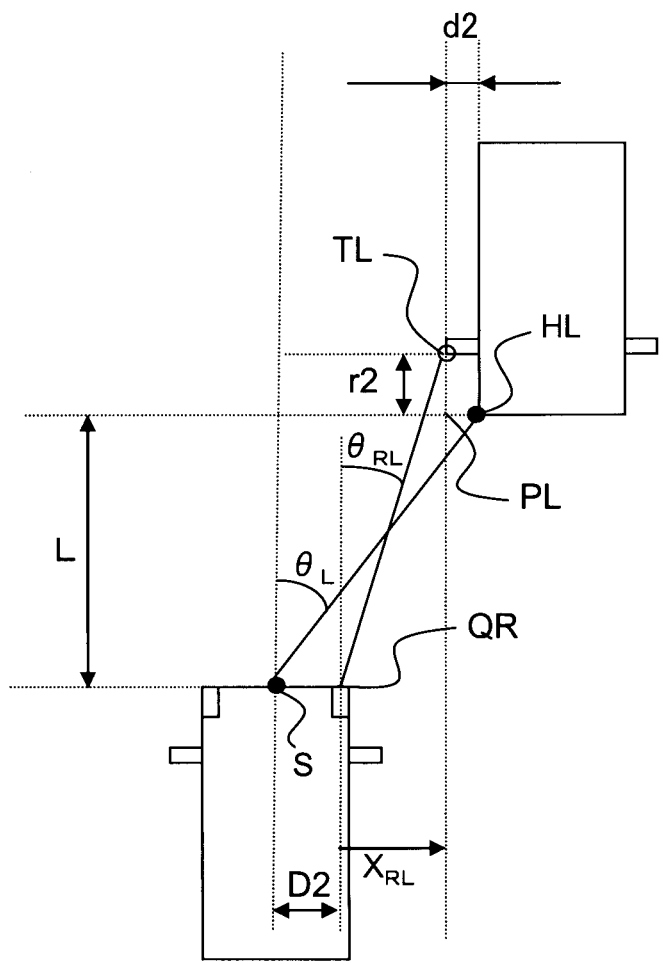
FIG. 14D is a view showing a method for calculating the horizontal surface interior angle $\theta_{RL}$ when the forward vehicle is an oncoming vehicle and the base amount $X_{RL}$ is negative.

When the forward vehicle is an oncoming vehicle, as shown in FIGS. 14C and 14D, the base amount $X_{RL}$ is calculated by the following formula.

$$X_{RL}=L \times \tan(\theta_L)+d2+D2$$

An amount D2 is an absolute value of an amount of position deviation of the right lighting fixture mounting position QR in the vehicle lateral direction with respect to the sensor mounting position S. A value of the absolute value D2 of the amount of deviation can be determined based on the values of the sensor mounting position and the right lighting fixture mounting position stored in the ROM. Alternatively, when a value of the absolute value D2 of the amount of deviation is stored in the ROM of the lamp ECU 11, a value of the absolute value D2 of the amount of deviation can be determined by reading the value stored in the ROM.

When the forward vehicle is a preceding vehicle and the base amount $X_{RL}$ is positive, as shown in FIG. 14A, the horizontal surface interior angle $\theta_{RL}$ is calculated by the following formula.

$$\theta_{RL}=a \tan \{(L \cdot \tan \theta_L + d1 + D2)/L\}$$

In this case, the horizontal surface interior angle $\theta_{RL}$ is a horizontal surface interior angle indicating a direction of the target position TL when viewed from the right lighting fixture mounting position QR and indicates a parallax-corrected direction acquired after performing the parallax correction with respect to the horizontal surface interior angle $\theta_L$. In this case, the target position TL is located in the same position as the base position PL. That is, the longitudinal offset amount calculated in the step 142 is not used for the parallax correction.

When the forward vehicle is a preceding vehicle and the base amount $X_{RL}$ is negative, as shown in FIG. 14B, the horizontal surface interior angle $\theta_{RL}$ is calculated by the following formula.

$$-\theta_{RL}=a \tan \{(-L \cdot \tan \theta_L - d1 - D2)/(L+r1)\}$$

In this case, the horizontal surface interior angle $\theta_{RL}$ is a horizontal surface interior angle indicating a direction of the target position TL when viewed from the right lighting fixture mounting position QR and indicates a parallax-corrected direction acquired after performing the parallax correction with respect to the horizontal surface interior angle $\theta_L$. In this case, the target position TL is a position deviated by the longitudinal offset amount r1 forward in the vehicle longitudinal direction from the base position PL.

When the forward vehicle is an oncoming vehicle and the base amount $X_{RL}$ is positive, as shown in FIG. 14C, the horizontal surface interior angle $\theta_{RL}$ is calculated by the following formula.

$$\theta_{RL}=a \tan \{(L \cdot \tan \theta_L + d2 + D2)/L\}$$

In this case, the horizontal surface interior angle $\theta_{RL}$ is a horizontal surface interior angle indicating a direction of the target position TL when viewed from the right lighting fixture mounting position QR and indicates a parallax-corrected direction acquired after performing the parallax correction with respect to the horizontal surface interior angle $\theta_L$. In this case, the target position TL is located in the same position as the base position PL.

When the forward vehicle is an oncoming vehicle and the base amount $X_{RL}$ is negative, as shown in FIG. 14D, the horizontal surface interior angle $\theta_{RL}$ is calculated by the following formula.

$$-\theta_{RL}=a \tan \{(-L \cdot \tan \theta_L - d2 - D2)/(L+r2)\}$$

In this case, the horizontal surface interior angle $\theta_{RL}$ is a horizontal surface interior angle indicating a direction of the target position TL when viewed from the right lighting fixture mounting position QR and indicates a parallax-corrected direction acquired after performing the parallax correction with respect to the horizontal surface interior angle $\theta_L$. In this case, the target position TL is a position deviated by the longitudinal offset amount r2 forward in the vehicle longitudinal direction from the base position PL.

Subsequently, in step 149, a horizontal surface interior angle $\theta_{RR}$ is calculated. A method for calculating the horizontal surface interior angle $\theta_{RR}$ varies depending on whether the forward vehicle is a preceding vehicle or an oncoming vehicle and whether a base amount $X_{RR}$ is positive or negative.

Figure 15A:
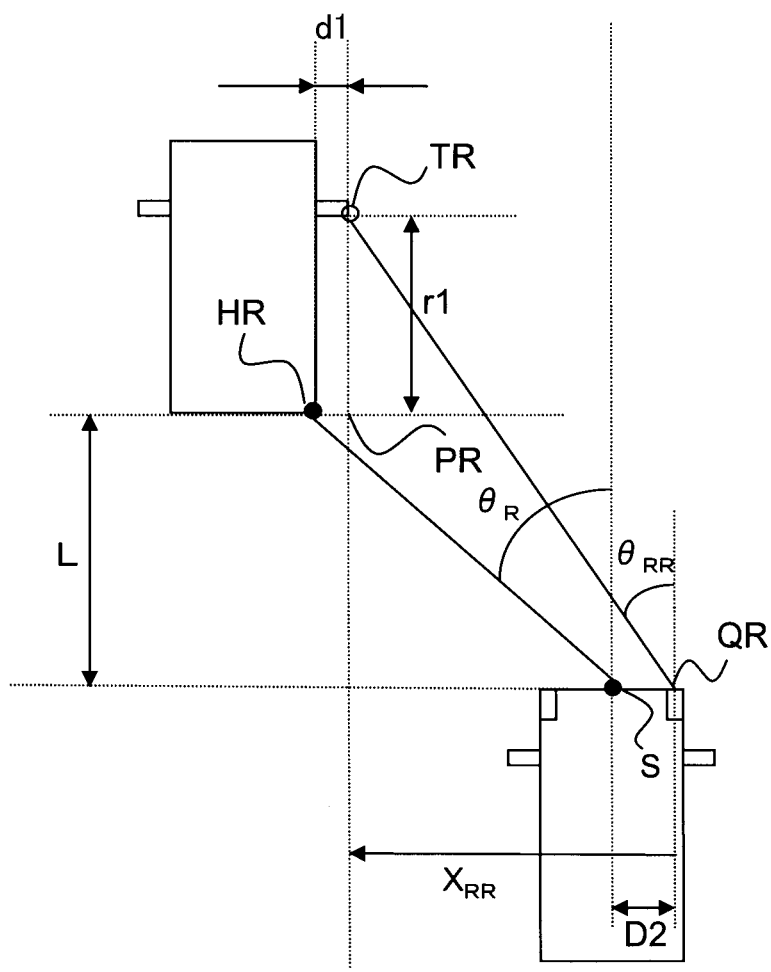
FIG. 15A is a view showing a method for calculating a horizontal surface interior angle $\theta_{RR}$ when the forward vehicle is a preceding vehicle and a base amount $X_{RR}$ is positive.
Figure 15B:
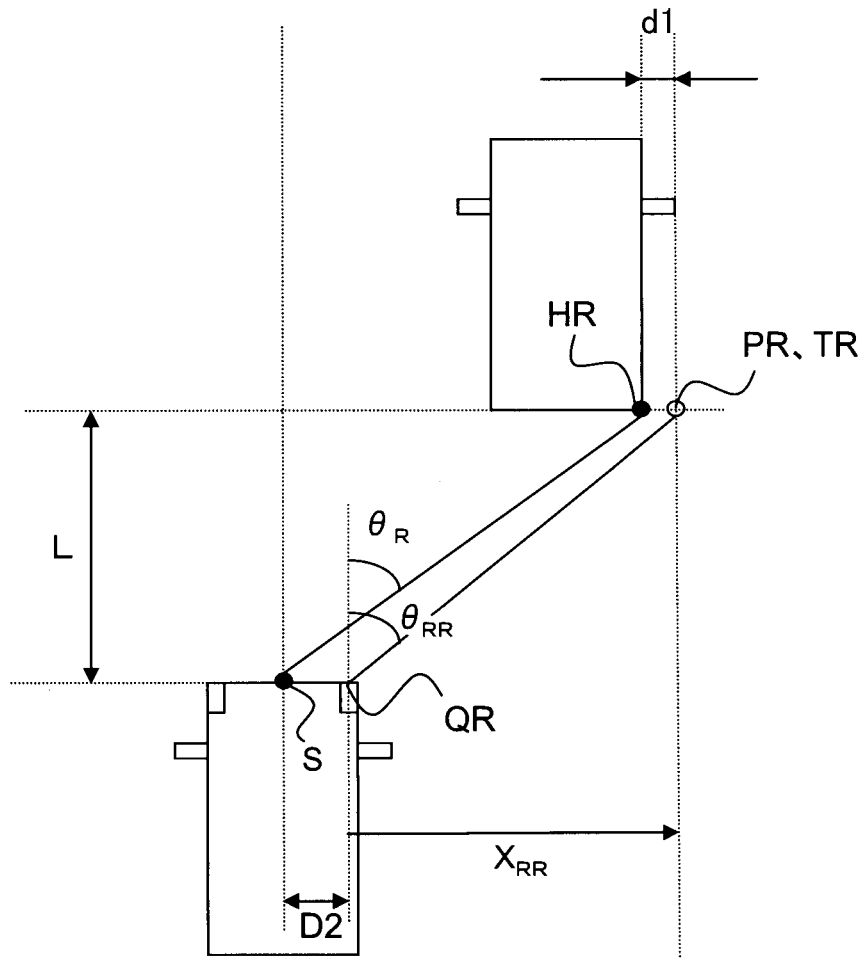
FIG. 15B is a view showing a method for calculating the horizontal surface interior angle $\theta_{RR}$ when the forward vehicle is a preceding vehicle and the base amount $X_{RR}$ is negative.

The base amount $X_{RR}$ is an amount which is positive in a case where the base position PR which is offset by the lateral offset amount d from the light source HR on the right side of the forward vehicle to the right side in the vehicle left-right direction is deviated to the left side in the vehicle left-right direction when viewed from the right lighting fixture mounting position QR of the vehicle and is negative in a case where the base position PR is deviated to the right side in the vehicle left-right direction when viewed from the right lighting fixture mounting position QR. Specifically, when the forward vehicle is a preceding vehicle, as shown in FIGS. 15A and 15B, the base amount $X_{RR}$ is calculated by the following formula.

$$X_{RR}=L \times \tan(\theta_R)-d1+D2$$

Figure 15C:
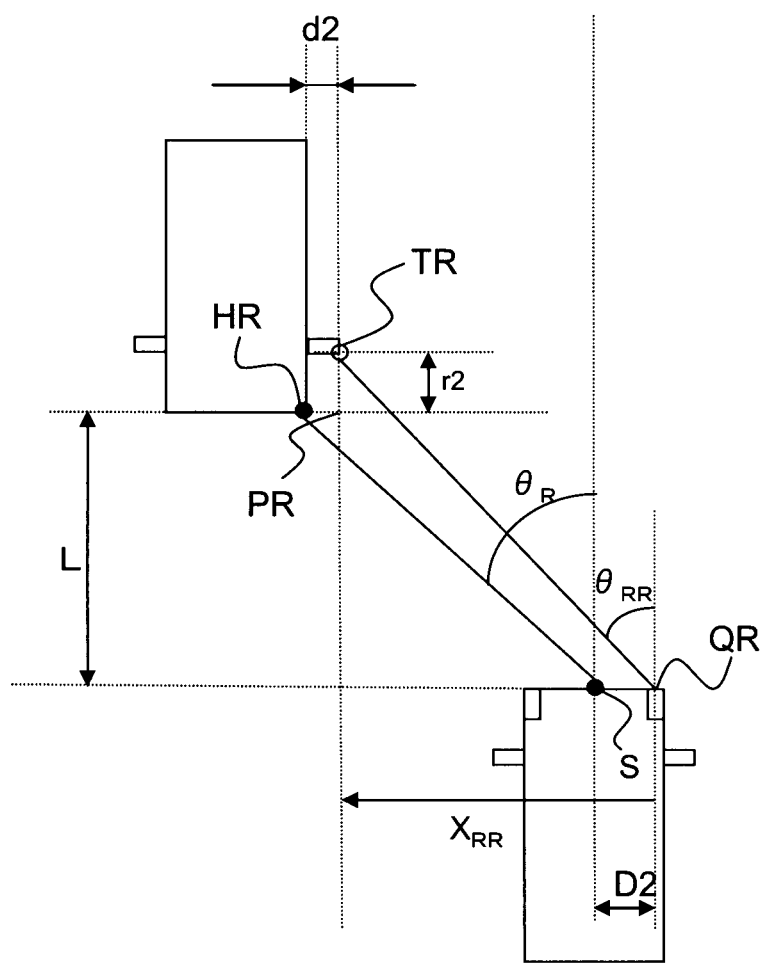
FIG. 15C is a view showing a method for calculating the horizontal surface interior angle $\theta_{RR}$ when the forward vehicle is an oncoming vehicle and the base amount $X_{RR}$ is positive.
Figure 15D:
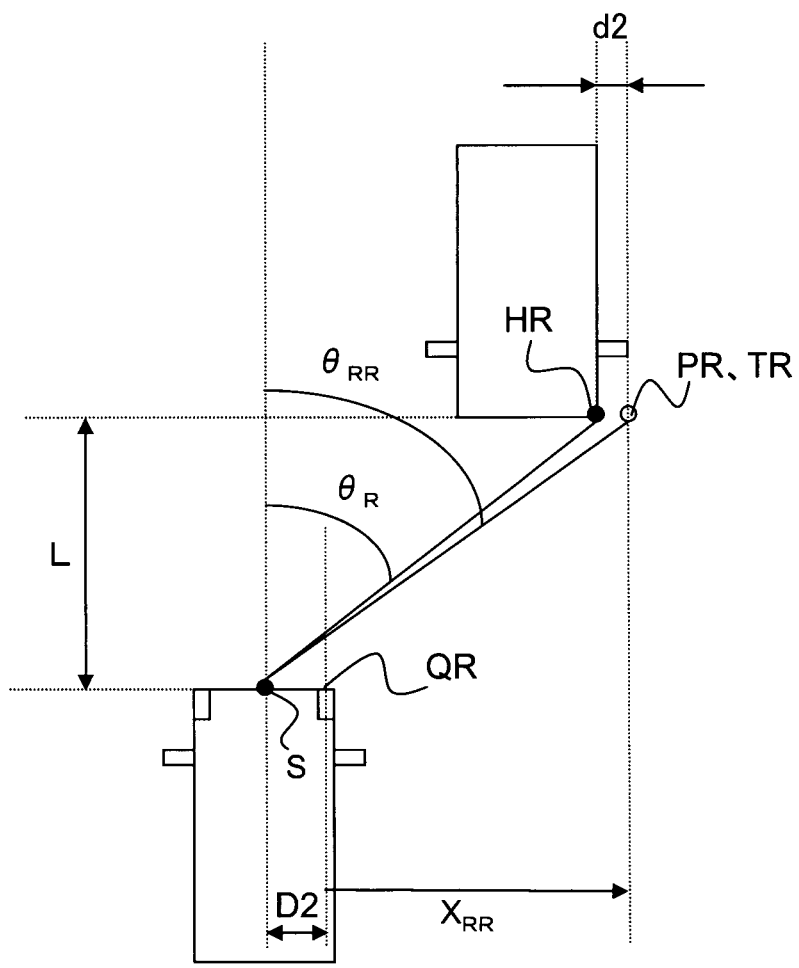
FIG. 15D is a view showing a method for calculating the horizontal surface interior angle $\theta_{RR}$ when the forward vehicle is an oncoming vehicle and the base amount $X_{RR}$ is negative.

When the forward vehicle is an oncoming vehicle, as shown in FIGS. 15C and 15D, the base amount $X_{RR}$ is calculated by the following formula.

$$X_{RR}=L \times \tan(\theta_R)-d2+D2$$

The amount D2 is an absolute value of an amount of position deviation of the right lighting fixture mounting position QR in the vehicle lateral direction with respect to the sensor mounting position S.

When the forward vehicle is a preceding vehicle and the base amount $X_{RR}$ is positive, as shown in FIG. 15A, the horizontal surface interior angle $\theta_{RR}$ is calculated by the following formula.

$$\theta_{RR}=a \tan \{(L \cdot \tan \theta_R - d2 + D2)/(L+r2)\}$$

In this case, the horizontal surface interior angle $\theta_{RR}$ is a horizontal surface interior angle indicating a direction of the target position TR when viewed from the right lighting fixture mounting position QR and indicates a parallax-corrected direction acquired after performing the parallax correction with respect to the horizontal surface interior angle $\theta_R$. In this case, the target position TR is a position deviated by the longitudinal offset amount r1 forward in the vehicle longitudinal direction from the base position PR.

When the forward vehicle is a preceding vehicle and the base amount $X_{RR}$ is negative, as shown in FIG. 15B, the horizontal surface interior angle $\theta_{RR}$ is calculated by the following formula.

$$-\theta_{RR}=a \tan \{(-L \cdot \tan \theta_R + d1 - D2)/L\}$$

In this case, the horizontal surface interior angle $\theta_{RR}$ is a horizontal surface interior angle indicating a direction of the target position TR when viewed from the right lighting fixture mounting position QR and indicates a parallax-corrected direction acquired after performing the parallax correction with respect to the horizontal surface interior angle $\theta_R$. In this case, the target position TR is located in the same position as the base position PR. That is, the longitudinal offset amount calculated in the step 142 is not used for the parallax correction.

When the forward vehicle is an oncoming vehicle and the base amount $X_{RR}$ is positive, as shown in FIG. 15C, the horizontal surface interior angle $\theta_{RR}$ is calculated by the following formula.

$$\theta_{RR} = a \tan \{(L \cdot \tan \theta_R - d2 + D2)/(L + r2)\}$$

In this case, the horizontal surface interior angle $\theta_{RR}$ is a horizontal surface interior angle indicating a direction of the target position TR when viewed from the right lighting fixture mounting position QR and indicates a parallax-corrected direction acquired after performing the parallax correction with respect to the horizontal surface interior angle $\theta_R$. In this case, the target position TR is a position deviated by the longitudinal offset amount r2 forward in the vehicle longitudinal direction from the base position PR.

When the forward vehicle is an oncoming vehicle and the base amount $X_{RR}$ is negative, as shown in FIG. 14D, the horizontal surface interior angle $\theta_{RR}$ is calculated by the following formula.

$$-\theta_{RR} = a \tan \{(-L \cdot \tan \theta_R + d2)/L\}$$

In this case, the horizontal surface interior angle $\theta_{RR}$ is a horizontal surface interior angle indicating a direction of the target position TR when viewed not from the right lighting fixture mounting position QR but from the sensor mounting position S. That is, no parallax correction is performed in accordance with the position deviation between the right lighting fixture mounting position QR and the sensor mounting position S. In this case, the target position TR is located in the same position as the base position PR.

After the step 149, the process in the step 140 ends. A direction range from the calculated horizontal surface interior angle $\theta_{LL}$ to the calculated horizontal surface interior angle $\theta_{LR}$ is a light shielding range of the left LED array unit 16L. A direction range from the calculated horizontal surface interior angle $\theta_{RL}$ to the calculated horizontal surface interior angle $\theta_{RR}$ is a light shielding range of the right LED array unit 16R.

In the step 140, when the forward vehicle is a two-wheeled vehicle, the lamp ECU 11 performs the process assuming that the light source HL on the left side of the vehicle is located in the same position as the light source HL on the right side of the vehicle.

While the execution of the main process is repeated, the lamp ECU 11 frequently changes the horizontal surface angles $\theta_{LL}$, $\theta_{LR}$, $\theta_{RL}$, and $\theta_{RR}$ in accordance with a change in position and attitude of the own vehicle and a change in position and attitude of the forward vehicle. Subsequent to the step 140, control proceeds to the step 150.

In the step 150, a process for determining a switching time is performed. In the process for determining a switching time, a beam switching time and a channel switching time are determined. For example, the beam switching time and the channel switching time can each have a constant value determined in advance. Furthermore, the beam switching time and the channel switching time can have the same value or different values.

The beam switching time is time that the LEDs 192a to 192k spend switching from light ON to light OFF or time that the LEDs 192a to 192k spend switching from light OFF to light ON when a luminance of the LEDs 192a to 192k gradually changes over time between light ON and light OFF in accordance with a change in beam mode.

The channel switching time is time that the LEDs 192a to 192k spend switching from light ON to light OFF and time that the LEDs 192a to 192k spend switching from light OFF to light ON when a luminance of the LEDs 192a to 192k gradually changes over time between light ON and light OFF in the S-Hi mode.

Subsequently, in the step 160, a leveling amount is determined. The leveling amount is an angle of the optical axis of each of the LEDs 12L, 12R, 13L, and 13R, the LEDs 192a to 192k of the left LED array unit 16L, and the LEDs 192a to 192k of the right LED array unit 16R with respect to the surface perpendicular to the up-down direction of the vehicle.

This angle can be determined, for example, based on the position coordinates of the target which are included in the image sensor information acquired in the step 110. Alternatively, the angle can be determined based on an angle of inclination, in a longitudinal direction, of a road on which the vehicle is traveling. When information on the angle of inclination of the road in the longitudinal direction is used, the lamp ECU 11 can acquire information on vehicle body acceleration together with the information on the vehicle speed from the in-vehicle LAN in the step 110, identify a direction of gravity based on the information on the vehicle speed and the information on the vehicle body acceleration, and identify the angle of inclination of the road in the longitudinal direction based on the identified direction of gravity.

Subsequently, in step 170, the LEDs 12L, 12R, 13L, and 13R, the left leveling motor 14L, and the left driver 15L are controlled based on the beam mode determined in the step 120 and the leveling amount determined in the step 160.

Specifically, when the beam mode determined in the last step 120 is the Hi mode, the left Lo-LED 12L and the right Lo-LED 12R are caused to be in a light ON state and the left Hi-LED 13L and the right Hi-LED 13R are caused to be in the light ON state. When the beam mode determined in the last step 120 is the Lo mode or the S-Hi mode, the left Lo-LED 12L and the right Lo-LED 12R are caused to be in the light ON state and the left Hi-LED 13L and the right Hi-LED 13R are caused to be in a light OFF state. Furthermore, the left leveling motor 14L and the right leveling motor 14R are controlled so that the leveling amount determined in the last step 160 is achieved.

Subsequently, in step 180, a command is outputted to the left driver 15L and the right driver 15R. The command to be outputted includes the beam mode determined in the last step 120 and the beam switching time and channel switching time determined in the step 150. Note, however, that only when the beam mode determined in the last step 120 is the S-Hi mode, the command also includes the light shielding range determined in the step 140. After the step 180, one main process ends.

Each time when the process in FIG. 16 is performed, the drivers 15L and 15R each first acquire in step 210 a command outputted from the lamp ECU 11. Subsequently, in step 215, the drivers 15L and 15R determine an intended light ON/OFF state for each of the LEDs 192a to 192k of the LED array units 16L and 16R based on the command acquired in the last step 210.

Specifically, when the beam mode in the acquired command is the Lo mode, the left driver 15L determines the intended light ON/OFF state to be the "light OFF state" for all of the LEDs 192a to 192k of the left LED array unit 16L. When the beam mode in the acquired command is the Hi mode, the left driver 15L determines the intended light ON/OFF state to be the "light ON state" for all of the LEDs 192a to 192k of the left LED array unit 16L.

When the beam mode in the acquired command is the S-Hi mode, the left driver 15L determines the intended light ON/OFF state for each of the LEDs 192a to 192k of the left LED array unit 16L based on the light shielding range (i.e., range from $\theta_{LL}$ to $\theta_{LR}$) of the left LED array unit 16L in the command.

As data necessary for this process, for the respective LEDs 192a to 192k of the left LED array unit 16L, ranges $\varphi L_1$ to $\varphi L_{11}$ of horizontal surface angles at which illumination is provided by the respective LEDs 192a to 192k of the left LED array unit 16L are stored in advance in the ROM of the left driver 15L.

Note that $\varphi L_j$ (j=1, 2, ... 11) is an amount indicating a range (e.g., not less than 0° and not more than 11°) of a horizontal surface angle at which illumination is provided by a jth LED from left among the LEDs 192a to 192k of the left LED array unit 16L. For example, $\varphi L_j$ is a range with an angular width of 11°.

For each of the LEDs 192a to 192k of the left LED array unit 16L, the left driver 15L reads from the ROM a range $\varphi L_i$ (i is a corresponding number) of a horizontal surface angle at which illumination is provided by the corresponding one of the LEDs 192a to 192k of the left LED array unit 16L. The left driver 15L then determines whether at least part of the read range $\varphi L_i$ is included in the light shielding range of the left LED array unit 16L. When the left driver 15L determines that at least part of the range $\varphi L_i$ is included in the light shielding range, the left driver 15L determines the light ON/OFF state for the corresponding one of the LEDs 192a to 192k to be the "light OFF state." When the left driver 15L determines that the range $\varphi L_i$ is not included in the light shielding range, the left driver 15L determines the light ON/OFF state for the corresponding one of the LEDs 192a to 192k to be the "light ON state." That is, the left driver 15L determines the intended light ON/OFF state for each of the LEDs 192a to 192k so that the light shielding range is not illuminated with light emitted by the LEDs 192a to 192k and a range which is not the light shielding range is illuminated with light emitted by the LEDs 192a to 192k.

As already described, the light shielding range of the left LED array unit 16L frequently changes. Thus, in accordance with the change in light shielding range, in the process as described above, the left driver 15L changes a combination of some LEDs which are turned on and the other LEDs which are not turned on among the LEDs 192a to 192k of the left LED array unit 16L. This consequently causes an LED which switches from the light ON state to the light OFF state and an LED which switches from the light OFF state to the light OFF state. This allows the left driver 15L to change the illumination region which is illuminated with light emitted by the LEDs 192a to 192k and the light shielding region which is not illuminated with light emitted by the LEDs 192a to 192k in front of the own vehicle.

When the beam mode in the acquired command is the Lo mode, the right driver 15R determines the intended light ON/OFF state to be the "light OFF state" for all of the LEDs 192a to 192k of the right LED array unit 16R. When the beam mode in the acquired command is the Hi mode, the right driver 15R determines the intended light ON/OFF state to be the "light ON state" for all of the LEDs 192a to 192k of the right LED array unit 16R.

When the beam mode in the acquired command is the S-Hi mode, the right driver 15R determines the intended light ON/OFF state for each of the LEDs 192a to 192k of the right LED array unit 16R based on the light shielding range (i.e., range from $\theta_{RL}$ to $\theta_{RR}$) of the right LED array unit 16R in the command.

As data necessary for this process, for the respective LEDs 192a to 192k of the right LED array unit 16R, ranges $\varphi R_1$ to $\varphi R_{11}$ of horizontal surface angles at which illumination is provided by the respective LEDs 192a to 192k of the right LED array unit 16R are stored in advance in the ROM of the right driver 15R.

Note that $\varphi R_j$ (j=1, 2, ... 11) is an amount indicating a range (e.g., not less than 0° and not more than 11°) of a horizontal surface angle at which illumination is provided by a jth LED from left among the LEDs 192a to 192k of the right LED array unit 16R. For example, $\varphi R_j$ is a range with an angular width of 11°.

For each of the LEDs 192a to 192k of the right LED array unit 16R, the right driver 15R reads from the ROM a range $\varphi R_i$ (i is a corresponding number) of a horizontal surface angle at which illumination is provided by the corresponding one of the LEDs 192a to 192k of the right LED array unit 16R. The right driver 15R then determines whether at least part of the read range $\varphi R_i$ is included in the light shielding range of the right LED array unit 16R. When the right driver 15R determines that at least part of the range $\varphi R_i$ is included in the light shielding range, the right driver 15R determines the light ON/OFF state for the corresponding one of the LEDs 192a to 192k to be the "light OFF state." When the right driver 15R determines that the range $\varphi R_i$ is not included in the light shielding range, the right driver 15R determines the light ON/OFF state for the corresponding one of the LEDs 192a to 192k to be the "light ON state." That is, the right driver 15R determines the intended light ON/OFF state for each of the LEDs 192a to 192k so that the light shielding range is not illuminated with light emitted by the LEDs 192a to 192k and a range which is not the light shielding range is illuminated with light emitted by the LEDs 192a to 192k.

As already described, the light shielding range of the right LED array unit 16R frequently changes. Thus, in accordance with the change in light shielding range, in the process as described above, the right driver 15R changes a combination of some LEDs which are turned on and the other LEDs which are not turned on among the LEDs 192a to 192k of the right LED array unit 16R. This consequently causes an LED which switches from the light ON state to the light OFF state and an LED which switches from the light OFF state to the light OFF state. This allows the right driver 15R to change the illumination region which is illuminated with light emitted by the LEDs 192a to 192k and the light shielding region which is not illuminated with light emitted by the LEDs 192a to 192k in front of the own vehicle.

Subsequent to the step 215, the drivers 15L and 15R each perform processes in steps 220 to 270 once for each of the corresponding LEDs 192a to 192k. That is, the left driver 15L performs the processes in the steps 220 to 270 once for each of the LEDs 192a to 192k of the left LED array unit 16L. The right driver 15R performs the processes in the steps 220 to 270 once for each of the LEDs 192a to 192k of the right LED array unit 16R.

Each time when the processes in the steps 220 to 270 are performed, the drivers 15L and 15R first determine in the step 220 whether switching of the light ON/OFF state needs to be started for a target LED. Specifically, when the intended light ON/OFF state determined in the last step 215 for the target LED has changed from the intended light ON/OFF state determined in the second to last step 215 for the target LED, the drivers 15L and 15R determine that the switching of the light ON/OFF state is necessary, and control proceeds to the step 230. When the intended light ON/OFF state for the target LED has not changed, the drivers 15L and 15R determine that the switching of the light ON/OFF state is unnecessary, and control proceeds to the step 225.

In the step 230, a switching flag for the target LED is set to ON. According to the left driver 15L, one switching flag for each of the LEDs 192a to 192k of the left LED array unit 16L, that is, 11 switching flags in total are set in the RAM. According to the right driver 15R, one switching flag for each of the LEDs 192a to 192k of the right LED array unit 16R, that is, 11 switching flags in total are set in the RAM.

In the step 240, an amount of change in duty ratio for the target LED is determined. The drivers 15L and 15R adjust a luminance of each of the LEDs by performing PWM control with respect to a value of an electric current to the corresponding one of the LEDs. An amount of change in duty ratio which is used at the time of the PWM control is the amount of change determined as above.

As a duty ratio for the target LED becomes greater, a luminance of the target LED becomes higher. When the duty ratio is a predetermined light OFF value DL (e.g., zero), the target LED is in a predetermined light OFF state. When the duty ratio is in a predetermined light ON value DH (e.g., 1), the target LED is in a predetermined light ON state.

The amount of change in duty ratio is determined based on the beam switching time or channel switching time received in the last step 210. Specifically, first, a code value is set to −1 when the intended light ON/OFF state determined in the last step 215 for the target LED is the "light OFF state" and the intended light ON/OFF state determined in the second to last step 215 for the target LED is the "light ON state." The code value is set to 1 when the intended light ON/OFF state determined in the last step 215 for the target LED is the "light ON state" and the intended light ON/OFF state determined in the second to last step 215 for the target LED is the "light OFF state."

Next, when the beam mode received in the last step 210 differs from the beam mode received in the second to last step 210, the amount of change in duty ratio is determined as below. A difference DH−DL between the light ON value DH and the light OFF value DL is multiplied by a control period to obtain a multiplication result. The multiplication result is then divided by the beam switching time to obtain a division result. A value obtained by multiplying the division result by the code value is determined as the amount of change in duty ratio for the target LED. The control period is a period in which the execution of the process in FIG. 16 is repeated.

When the beam mode received in the last step 210 and the beam mode received in the second to last step 210 are the same S-Hi mode, the amount of change in duty ratio is determined as below. The difference DH−DL between the light ON value DH and the light OFF value DL is multiplied by the control period to obtain a multiplication result. The multiplication result is then divided by the channel switching time to obtain a division result. A value obtained by multiplying the division result by the code value is determined as the amount of change in duty ratio for the target LED.

Thus, when an LED needs to be turned on due to a change in beam mode, as the amount of change in duty ratio for the LED, the drivers 15L and 15R set in the step 240 a positive value whose absolute value becomes smaller as the beam switching time becomes longer. When an LED needs to be turned off due to a change in beam mode, as the amount of change in duty ratio for the LED, the drivers 15L and 15R set in the step 240 a negative value whose absolute value becomes smaller as the beam switching time becomes longer.

When an LED needs to be turned on due to a change in light shielding range in the S-Hi mode, as the amount of change in duty ratio for the LED, the drivers 15L and 15R set in the step 240 a positive value whose absolute value becomes smaller as the channel switching time becomes longer.

When an LED needs to be turned off due to a change in light shielding range in the S-Hi mode, as the amount of change in duty ratio for the LED, the drivers 15L and 15R set in the step 240 a negative value whose absolute value becomes smaller as the channel switching time becomes longer.

The amount of change in duty ratio is, for example, a value of 0.25, 0.05, or the like. When the amount of change in duty ratio is the value of 0.25, the LED is switched between the light ON state and the light OFF state in four stages. When the amount of change in duty ratio is the value of 0.05, the LED is switched between the light ON state and the light OFF state in 20 stages. Subsequent to the step 240, the step 250 is performed.

In the step 250, the duty ratio for the target LED is changed. Specifically, a value obtained by adding the amount of change in duty ratio for the target LED to the current duty ratio for the target LED is set as a new duty ratio for the target LED. Accordingly, a luminance of the target LED is changed by the amount of change in duty ratio.

Subsequently, in the step 260, it is determined whether the switching of the light ON/OFF state for the target LED has been finished. Specifically, when the duty ratio for the target LED is the light OFF value DL or the light ON value DH, it is determined that the switching has been finished, and control proceeds to the step 270. When the duty ratio for the target LED is neither the light OFF value DL nor the light ON value DH, it is determined that the switching has not been finished, and the processes in the steps 220 to 270 for the target LED end.

In the step 270, the switching flag for the target LED is set to OFF, and then the processes in the steps 220 to 270 for the target LED end. In the step 225, it is determined whether the switching flag for the target LED is set to ON. When the switching flag for the target LED is ON, control proceeds to the step 250. When the switching flag for the target LED is OFF, the processes in the steps 220 to 270 for the target LED end.

By repeating the process in FIG. 16, for an LED which needs to switch between light OFF and light ON, the drivers 15L and 15R set the switching flag to ON in the step 230, determine the amount of change in duty ratio in the step 240, and change the duty ratio in the step 250.

Thereafter, for each control period, the duty ratio for the LED is changed by the above amount of change by performing the steps 225, 250, and 260 until the switching is finished and the switching flag is set to OFF in the step 270. Thus, the LED gradually changes in luminance in multiple stages from the light ON state to the light OFF state or from the light OFF state to the light ON state over the beam switching time or channel switching time which has been set in the process in FIG. 11.

Consequently, in the S-Hi mode, the drivers 15L and 15R achieve in the end a combination of light ON and light OFF of the LEDs 192a to 192k in which the light shielding range in the command outputted from the lamp ECU 11 is not illuminated and a region outside the light shielding range is illuminated.

As has been described above, from the image sensor 10 mounted in the sensor mounting position S, the lamp ECU 11 acquires the position of the light source (HL, HR) of the forward vehicle when viewed from the sensor mounting position S.

In all of the cases of FIGS. 12A to 12D, FIGS. 13A to 13D, FIGS. 14A to 14D, and FIGS. 15A to 15D except for the cases of FIGS. 12C and 15D, the lamp ECU 11 performs the parallax correction based on the position deviation amount D1 or D2. That is, based on the corresponding one of the position deviation amount D1 between the lighting fixture mounting position QL and the sensor mounting position S in the vehicle lateral direction and the position deviation amount D2 between the lighting fixture mounting position QR and the sensor mounting position S in the vehicle lateral direction, the lamp ECU 11 calculates each of the parallax-corrected directions $\theta_{LL}$, $\theta_{LR}$, $\theta_{RL}$, and $\theta_{RR}$ of the corresponding one of the target positions TL and TR, based on the acquired position of the light source of the forward vehicle, when viewed from the corresponding one of the lighting fixture mounting positions QL and QR. Based on the calculated parallax-corrected directions, the lamp ECU 11 then outputs the direction ranges which are viewed from the lighting fixture mounting position and in which illumination provided by the LED array units 16L and 16R needs to be suppressed.

Thus, based on the position deviation amounts D1 and D2 between the lighting fixture mounting position and the sensor mounting position, the lamp ECU 11 determines the light shielding ranges as the direction ranges in which illumination provided by the LED array units 16L and 16R needs to be suppressed. Accordingly, regardless of whether or not the mounting position of the image sensor 10 is a center in the vehicle lateral direction, the lamp ECU 11 can calculate with similar accuracy the direction range in which illumination provided by the headlight needs to be suppressed.

In FIGS. 12A to 12D, FIGS. 13A to 13D, FIGS. 14A to 14D, and FIGS. 15A to 15D, a direction of travel of the own vehicle is parallel to a direction of travel of the forward vehicle.

More specifically, when the forward vehicle is a preceding vehicle, that is, in the cases of FIGS. 12A, 12B, 13A, 13B, 14A, 14B, 15A, and 15B, the lamp ECU 11 always calculates the parallax-corrected direction based on the position deviation amount D1 or D2. That is, the lamp ECU 11 performs the parallax correction.

When the forward vehicle is an oncoming vehicle, however, the lamp ECU 11 may or may not perform the parallax correction. Specifically, the lamp ECU 11 does not perform the parallax correction by which the light shielding range is expanded as in the cases of FIGS. 12C and 15D.

In the case of FIG. 12C, the left lighting fixture mounting position QL is deviated to the left side (corresponding to an example of a certain side) in the vehicle lateral direction with respect to the sensor mounting position S. Furthermore, the light source which is a target (hereinafter referred to as target light source) HL is a light source also on the left side of two light sources of the forward vehicle. Furthermore, the target position TL is deviated also to the left side in the vehicle lateral direction with respect to the left lighting fixture mounting position QL. In such a case, when the parallax correction is performed, the light shielding range is expanded, and thus no parallax correction is performed. Instead, by the formula already described, in a case where the sensor mounting position S is a reference position, the horizontal surface interior angle of the target position TL when viewed from the reference position is used as the horizontal surface interior angle $\theta_{LL}$ based on which the direction range is determined.

As another example, in a case where a midpoint of a line segment connecting the left lighting fixture mounting position QL and the sensor mounting position S is a reference position, instead of the horizontal surface interior angle of the target position TL when viewed from the sensor mounting position S, a horizontal surface interior angle of the target position TL when viewed from the reference position can be used as the horizontal surface interior angle $\theta_{LL}$.

That is, in the case of FIG. 12C, when a reference position for calculating the horizontal surface interior angle $\theta_{LL}$ is compared with the left lighting fixture mounting position HL and the reference position is closer to the sensor mounting position S than the left lighting fixture mounting position HL is, it is possible to mitigate the parallax correction by which the light shielding range is expanded.

In the case of FIG. 15D, the right lighting fixture mounting position QR is deviated to the right side (corresponding to an example of the certain side) in the vehicle lateral direction with respect to the sensor mounting position S. Furthermore, the target light source HR is a light source also on the right side of the two light sources of the forward vehicle. Furthermore, the target position TR is deviated also to the right side in the vehicle lateral direction with respect to the right lighting fixture mounting position QR. In such a case, when the parallax correction is performed, the light shielding range is expanded, and thus no parallax correction is performed. Instead, by the formula already described, in a case where the sensor mounting position S is a reference position, the horizontal surface interior angle of the target position TR when viewed from the reference position is used as the horizontal surface interior angle $\theta_{RR}$ based on which the direction range is determined.

As another example, in a case where a midpoint of a line segment connecting the right lighting fixture mounting position QR and the sensor mounting position S is a reference position, instead of the horizontal surface interior angle of the target position TR when viewed from the sensor mounting position S, a horizontal surface interior angle of the target position TR when viewed from the reference position can be used as the horizontal surface interior angle $\theta_{RR}$.

That is, in the case of FIG. 15D, when a reference position for calculating the horizontal surface interior angle $\theta_{RR}$ is compared with the right lighting fixture mounting position HR and the reference position is closer to the sensor mounting position S than the right lighting fixture mounting position HR is, it is possible to mitigate the parallax correction by which the light shielding range is expanded.

In the cases of FIGS. 12C and 15D, the preceding vehicle is an oncoming vehicle and the following three conditions (a), (b), and (c) are satisfied. In such cases, as a boundary of the direction range which is viewed from the lighting fixture mounting position and in which illumination provided by the LED array unit needs to be suppressed, the lamp ECU 11 determines the horizontal surface interior angle of the target position when viewed from the reference position.

(a) The lighting fixture mounting position is deviated to a certain side in the vehicle lateral direction with respect to the sensor mounting position S.

(b) The target light source is a light source on the certain side of the two light sources of the forward vehicle.
(c) The target position is deviated to the certain side in the vehicle lateral direction with respect to the lighting fixture mounting position.

An oncoming vehicle tends to approach the own vehicle at a high speed as compared with a preceding vehicle. Accordingly, the oncoming vehicle immediately exceeds the direction ranges in which illumination provided by the LED array units 16L and 16R needs to be suppressed, and thus it becomes highly likely that an occupant of the oncoming vehicle is dazzled. Accordingly, when the forward vehicle is an oncoming vehicle as described above, with regard to the parallax correction for narrowing the direction ranges in which illumination provided by the LED array units 16L and 16R needs to be suppressed, as compared with a case where the forward vehicle is an oncoming vehicle, a weaker parallax correction is performed or no parallax correction is performed. This makes it possible to selectively and effectively reduce a possibility that the occupant of the oncoming vehicle is dazzled.

Even when the preceding vehicle is an oncoming vehicle, in the cases of FIGS. 12D, 13C, 13D, 14C, 14D, and 15C, only two or less of the above three conditions (a), (b), and (c) are satisfied, and thus the parallax correction does not result in expansion of the light shielding range. In these cases, therefore, the lamp ECU 11 performs the parallax correction as already described.

In any of the cases of FIGS. 12A to 12D, FIGS. 13A to 13D, FIGS. 14A to 14D, and FIGS. 15A to 15D, the corresponding one of the target positions TL and TR is set based on the lateral offset amount d1 or d2 stored in advance in a storage medium as an amount of offset outward in the vehicle lateral direction from the position of the target light source. This makes it possible to more reliably prevent glare for the side mirror of the forward vehicle.

As shown in FIG. 11, the lamp ECU 11 switches the lateral offset amount d depending on a type (e.g., large vehicle, standard vehicle, two-wheeled vehicle, or the like) of the forward vehicle. This allows a flexible setting of the lateral offset amount depending on a type of the vehicle.

As shown in FIG. 11, the lamp ECU 11 switches the lateral offset amount d depending on whether the forward vehicle is a preceding vehicle or an oncoming vehicle. This allows a flexible setting of the lateral offset amount depending on whether the vehicle is a preceding vehicle or an oncoming vehicle.

Even when the forward vehicle is an oncoming vehicle, the lamp ECU 11 sets the target positions TL and TR based on the lateral offset amount d2.

In the cases of FIGS. 12B, 12D, 13A, 13C, 14B, 14D, 15A, and 15C, the target position TL is deviated to the right side in the vehicle lateral direction with respect to the target lighting fixture mounting position or the target position TR is deviated to the left side in the vehicle lateral direction with respect to the target lighting fixture mounting position.

In such cases, the lamp ECU 11 sets the target position based on the longitudinal offset amount r1 or r2 stored in advance in the storage medium as an amount of offset forward in the direction of travel of the vehicle from the position of the target light source. This makes it possible to more reliably prevent glare for the side mirror of the forward vehicle.

In the cases of FIGS. 12A, 12C, 13B, 13D, 14A, 14C, 15B, and 15D, the target position TL is deviated to the left side in the vehicle lateral direction with respect to the target lighting fixture mounting position or the target position TR is deviated to the right side in the vehicle lateral direction with respect to the target lighting fixture mounting position.

In such cases, the lamp ECU 11 does not use the longitudinal offset amount r1 nor r2 stored in advance in the storage medium as the amount of offset forward in the direction of travel of the vehicle from the position of the target light source. This is to prevent the light shielding range from excessively being narrowed and causing the forward vehicle to be illuminated.

As shown in FIG. 10, the lamp ECU 11 switches the longitudinal offset amount r depending on a type (e.g., large vehicle, standard vehicle, two-wheeled vehicle) of the forward vehicle. This allows a flexible setting of the lateral offset amount depending on a type of the vehicle.

The lamp ECU 11 switches the longitudinal offset amount r depending on whether the forward vehicle is a preceding vehicle or an oncoming vehicle. This allows a flexible setting of the lateral offset amount depending on whether the vehicle is a preceding vehicle or an oncoming vehicle.

Even when the forward vehicle is an oncoming vehicle, the lamp ECU 11 sets the target position based on the longitudinal offset amount. Basically, when the forward vehicle is an oncoming vehicle, it is highly unlikely that the side mirror of the oncoming vehicle is illuminated by the headlight of the own vehicle. Even in such a case, the target position is set based on the longitudinal offset amount because if no longitudinal offset is provided, the occupant of the oncoming vehicle may be directly illuminated with light.

According to the aforementioned embodiment, a combination of the lamp ECU 11 and the drivers 15L and 15R corresponds to an example of the vehicle headlight control device. According to the present embodiment, storage media or memories are all non-transitory tangible storage media.

Other Embodiments

The present invention is not limited to the aforementioned embodiment and can be changed as appropriate within the scope of the claims. According to the aforementioned embodiment, an element constituting the embodiment is not necessarily essential unless, for example, it is in particular explicitly stated that the element is essential or the element is considered to be clearly essential in principle. According to the aforementioned embodiment, when a numerical value such as the number, numerical value, amount, or range of a component of the embodiment is mentioned, the numerical value is not limited to a specific number unless, for example, it is in particular explicitly stated that the specific number is essential or the numerical value is clearly limited to the specific number in principle. In particular, when a plurality of values are exemplified for a certain amount, a value between the plurality of values can be adopted unless it is particularly stated elsewhere or it is clearly impossible in principle. According to the aforementioned embodiment, when a shape, positional relationship, or the like of a component or the like is mentioned, the shape, positional relationship, or the like is not limited to a specific shape, positional relationship, or the like unless, for example, it is in particular explicitly stated or the shape, positional relationship, or the like is limited to the specific shape, positional relationship, or the like in principle. According to the present invention, modified examples as below of the aforementioned embodiment are allowable. It is possible to select whether or not to independently apply each of the modified examples below to the aforementioned embodiment. That is, any combination of the modified examples is applicable to the aforementioned embodiment except for an apparently contradictory combination of the modified examples.

Modified Example 1

According to the aforementioned embodiment, the drivers 15L and 15R are configured to turn off the LEDs which illuminate the respective light shielding ranges. However, the drivers 15L and 15R do not necessarily need to be thus configured. For example, based on a light shielding range in a command acquired from the LED array units 16L and 16R, the drivers 15L and 15R can perform control so that a luminance of an LED which illuminates the light shielding range becomes lower than that of other LEDs. This also makes it possible to suppress illumination provided by the headlight in the light shielding range and glare is prevented to some extent.

REFERENCE SIGNS LIST

QL, QR . . . Lighting fixture mounting position
PL, PR . . . Base position
TL, TR . . . Target position
S . . . Sensor mounting position, reference position
$\theta_{LL}$, $\theta_{LR}$, $\theta_{RL}$, $\theta_{RR}$ . . . Parallax-corrected direction
D1, D2 . . . Position deviation amount
10 . . . Image sensor
11 . . . Lamp ECU
15L, 15R . . . Driver
16L, 16R . . . LED array unit

The invention claimed is:

1. A headlight control system which controls a headlight mounted in a predetermined lighting fixture mounting position in a vehicle, the headlight control system comprising:
a range output section which acquires, from a sensor mounted in a predetermined sensor mounting position in the vehicle, a position of a target light source of a forward vehicle when viewed from the sensor mounting position, calculates, on a basis of an amount of position deviation between the lighting fixture mounting position and the sensor mounting position, a parallax-corrected direction of a target position when viewed from the lighting fixture mounting position, the target position being based on the acquired position of the target light source, and outputs, on a basis of the calculated parallax-corrected direction, a direction range which is viewed from the lighting fixture mounting position and in which illumination provided by the headlight needs to be suppressed; and
a control section which controls the headlight on a basis of the direction range outputted by the range output section.

2. The headlight control device as set forth in claim 1, wherein:
in a case where the forward vehicle is a preceding vehicle, the range output section calculates the parallax-corrected direction on a basis of the amount of position deviation and outputs the direction range on a basis of the calculated parallax-corrected direction;
the range output section outputs the direction range on a basis of a direction of the target position when viewed from a reference position, in a case where the forward vehicle is an oncoming vehicle, the lighting fixture mounting position is deviated to a certain side in a vehicle lateral direction of the vehicle with respect to the sensor mounting position, the target light source is a light source on the certain side of two light sources of the vehicle, and the target position is deviated to the certain side with respect to the lighting fixture mounting position; and
when the reference position is compared with the lighting fixture mounting position, the reference position is closer to the sensor mounting position than the lighting fixture mounting position is.

3. The headlight control device as set forth in claim 1, wherein:
the range output section sets the target position on a basis of a lateral offset amount which is stored in advance in a storage medium as an amount of offset outward in a lateral direction of the vehicle from the position of the target light source.

4. The headlight control device as set forth in claim 3, wherein:
the range output section switches the lateral offset amount depending on a type of the forward vehicle.

5. The headlight control device as set forth in claim 3, wherein:
the range output section switches the lateral offset amount depending on whether the forward vehicle is a preceding vehicle or an oncoming vehicle.

6. The headlight control device as set forth in claim 1, wherein:
the range output section sets the target position on a basis of a longitudinal offset amount which is stored in advance in a storage medium as an amount of offset forward in a direction of travel of the vehicle from the position of the target light source.

7. The headlight control device as set forth in claim 6, wherein:
the range output section switches the longitudinal offset amount depending on a type of the forward vehicle.

8. The headlight control device as set forth in claim 6, wherein:
the range output section switches the longitudinal offset amount depending on whether the forward vehicle is a preceding vehicle or an oncoming vehicle.

* * * * *